US009369932B2

(12) United States Patent
Wu et al.

(10) Patent No.: US 9,369,932 B2
(45) Date of Patent: Jun. 14, 2016

(54) METHOD AND APPARATUS FOR DISPLAYING NETWORK NAME

(71) Applicant: Huawei Technologies Co., Ltd., Shenzhen (CN)

(72) Inventors: Xiaobo Wu, Shanghai (CN); Lin Shu, Shanghai (CN); Wanqiang Zhang, Beijing (CN); Hai Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/618,849

(22) Filed: Feb. 10, 2015

(65) Prior Publication Data

US 2015/0156687 A1 Jun. 4, 2015

Related U.S. Application Data

(63) Continuation of application No. PCT/CN2012/080363, filed on Aug. 20, 2012.

(51) Int. Cl.
*H04W 36/00* (2009.01)
*H04W 48/16* (2009.01)
(Continued)

(52) U.S. Cl.
CPC .......... *H04W 36/0083* (2013.01); *H04W 48/16* (2013.01); *H04W 48/18* (2013.01); *H04W 36/0022* (2013.01); *H04W 60/005* (2013.01)

(58) Field of Classification Search
CPC .................................................... H04W 36/00
See application file for complete search history.

(56) References Cited

U.S. PATENT DOCUMENTS 8,116,744 B1 2/2012 Mikan et al.
2009/0270099 A1* 10/2009 Gallagher .............. H04W 8/08 455/435.1
2011/0032902 A1 2/2011 Kim
(Continued)

FOREIGN PATENT DOCUMENTS

CN 1756390 A 4/2006
CN 1889789 A 1/2007
(Continued)

OTHER PUBLICATIONS

"3rd Generation Partnership Project; Technical Specification Group Services and System Aspects; Intra-Domain Connection of Radio Access Network (RAN) Nodes to Multiple Core Network (CN) Nodes (Release 10)," 3GPP TS 23.236, V10.3.0, Mar. 2012, 39 pages.
(Continued)

*Primary Examiner* — Michael T Vu
(74) *Attorney, Agent, or Firm* — Slater Matsil, LLP

(57) ABSTRACT

A method and an apparatus for displaying a network name are provided. By using a combined attach procedure or a combined tracking area update procedure, a user equipment UE registers with a long term evolution network and a first circuit switched domain network, and acquires a public land mobile network identity PLMN ID of the long term evolution network and a PLMN ID of the circuit switched domain network. The UE displays a first network name corresponding to a predetermined PLMN ID before a to-be-displayed second network name sent by a first network device on the long term evolution network is received. The predetermined PLMN ID is one of the PLMN ID of the long term evolution network and the PLMN ID of the circuit switched domain network.

20 Claims, 8 Drawing Sheets

By using a combined attach procedure or a combined tracking area update procedure, a UE registers with an LTE network and a first CS domain network, and acquires a PLMN ID of the LTE network and a PLMN ID of the CS domain network — 110

Before a to-be-displayed second network name sent by a first network device on the long term evolution network is received, the UE displays a first network name corresponding to a predetermined PLMN ID, where the predetermined PLMN ID is one of the PLMN ID of the long term evolution network and the PLMN ID of the circuit switched domain network — 120

If the to-be-displayed second network name sent by the first network device on the LTE network is received, the UE displays the second network name sent by the first network device — 130

(51) Int. Cl.
*H04W 48/18* (2009.01)
*H04W 60/00* (2009.01)

(56) References Cited

U.S. PATENT DOCUMENTS

2012/0270549 A1* 10/2012 Zinn .................... H04W 8/183 455/435.2
2014/0301366 A1 10/2014 Guo

FOREIGN PATENT DOCUMENTS

CN 101610504 A 12/2009
CN 101677481 A 3/2010
CN 101997951 A 3/2011
EP 1513358 A1 3/2005
EP 2048891 A1 4/2009

OTHER PUBLICATIONS

"3rd Generation Partnership Project; Technical Specification Group Services and System Aspects; Network Sharing; Architecture and Functional Description (Release 11)," 3GPP TS 23.251, Jun. 2012, 29 pages.

"3rd Generation Partnership Project; Technical Specification Group Services and System Aspects; Circuit Switched (CS) Fallback in Evolved Packet System (EPS); Stage 2 (Release 11)," 3GPP TS 23.272, V11.1.0, Jun. 2012, 90 pages.

3rd Generation Partnership Project; Technical Specification Group Services and System Aspects; General Packet Radio Services (GPRS) Enhancements for Evolved Universal Terrestrial Radio Access Network (E-UTRAN) Access Network (Release 11), 3GPP TS 23.401, v11.2.0, Jun. 2012, 285 pages.

Alcatel-Lucent, "Full-MOCN-GERAN: Detailed Technical Discussion," 3GPP TSG GERAN WG2 Meeting #52, Tdoc GP-111723, Nov. 22-24, 2011, 8 pages.

Huawei, et al., "Asynchronous Display of Network Name in CSFB Deployment," 3GPP TSG CT WG1 Meeting #73, C1-113214, Aug. 22-26, 2011, 4 pages.

Huawei, et al., "Network Name Display in CSFB Deployment," 3GPP TSG CT WG1 Meeting #74, C1-113943, Oct. 10-14, 2011, 4 pages.

* cited by examiner

METHOD AND APPARATUS FOR DISPLAYING NETWORK NAME

This application is a continuation of International Application No. PCT/CN2012/080363, filed on Aug. 20, 2012, which is hereby incorporated by reference in its entirety.

TECHNICAL FIELD

The present invention relates to the field of wireless communications, and in particular, to a method and an apparatus for displaying a network name.

BACKGROUND

The 3rd Generation Partnership Project (3GPP) has launched, based on existing 2nd generation (2G) mobile telecommunications and 3rd generation (3G) mobile telecommunications networks, an evolved packet system (EPS). An EPS network includes an evolved universal mobile telecommunication system territorial radio access network (E-UTRAN) and an evolved packet core (EPC) network. At an early stage of EPS network construction, an operator has already had a mature circuit switched (CS) network; however, the EPS network processes only a packet switched (PS) service. In view of protection for CS network investment and a policy on EPS network deployment, the operator may use an original CS network device to provide a CS service. To meet this requirement, 3GPP expands a function of a Gs interface between a mobile switching center/visitor location register (MSC/VLR) and a serving GPRS support node (SGSN) that are on the existing 2G or 3G network, and defines an SGs interface between the MSC/VLR and an mobility management entity (MME) on the EPC network. Based on a function of the SGs interface, 3GPP proposes a CS fallback (CSFB) technology and a short message service message over SGs (SMS over SGs) technology. By means of the CSFB technology, a user equipment (UE) covered by an the E-UTRAN falls back to a CS domain on the 2G or 3G network by using the E-UTRAN when a CS voice service needs to be processed, so as to complete processing of the CS voice service. By means of the SMS over SGs technology, the UE residing in the E-UTRAN reuses an existing CS domain device to implement transmission of a short message service message in the CS domain.

To greatly reduce high deployment costs of a radio access network for an operator, 3GPP proposes an idea of network sharing, that is, public land mobile networks (PLMN) of multiple operators or multiple PLMNs of one operator can share a same radio access network to provide a radio communication service. Similarly, for the CSFB technology and the SMS over SGs technology, an operator proposes a requirement for CS domain network sharing, which mainly has the following two scenarios:

Scenario 1: A conventional operator upgrades an existing CS domain network (including a 2G network or a 3G network), to support the CSFB technology and the SMS over SGs technology, that is, the operator can provide, by sharing multiple PLMNs operated by the operator or sharing a PLMN of another operator by signing a roaming agreement, a CS service for a UE residing in an E-UTRAN.

Scenario 2: An operator who provides an emerging pure PS service rents a CS domain network from a conventional operator by signing an agreement, to support the CSFB technology and the SMS over SGs technology.

In the foregoing scenarios of CS domain network sharing, multiple available PLMNs may provide a CS service for a same UE residing in an E-UTRAN. During a combined attach procedure or a combined tracking area update procedure that is initiated by the UE, if multiple available PLMNs provide a CS service for the UE, an MME selects a proper PLMN according to a PLMN, location information of a tracking area in which the UE is currently located, and a CS domain network selection policy of an operator, where the PLMN, the location information, and the CS domain network selection policy are reported by an evolved node B (eNB). A corresponding CS domain location area identity (LAI) is allocated, based on the selected PLMN and the location information of the tracking area in which the UE is located, to the UE, and an associated MSC/VLR is selected based on the LAI. After the combined attach procedure is complete, the UE receives an attach accept message sent by the MME, where the attach accept message carries a tracking area identity list (TAI list), an LAI, and a VLR temporary mobile subscriber identity (TMSI). For the UE, that the LAI and the VLR TMSI is acquired by the UE means CS domain attaching is successful.

After the combined attach procedure is complete, the UE successfully registers with a network of an operator, and the UE needs to display a name of the registered network; or after the combined tracking area update procedure, the UE needs to display a name of a registered network. Currently, displaying of a network name by the UE is mainly based on two policies.

Policy 1: A network side does not perform a configuration, and the UE displays a network name according to a configuration of the UE.

Specifically, the UE displays, according to a PLMN identity (ID) of a currently registered network, a network name corresponding to the PLMN ID.

However, in some scenarios, the UE cannot determine which PLMN ID corresponding to a network name to be display.

Policy 2: A network side delivers a to-be-displayed network name to the UE.

When receiving the network name delivered by the network side, the UE may use the received network name to update a network name configured by the UE, and display the updated network name.

1) An MME informs the UE of the to-be-displayed network name by using an E-UTRAN mobile management information (EMM information) message, and the UE displays the informed network name, where the network name informed by the MME is determined by the MME according to a home PLMN (HPLMN) of the MME.

2) An MSC/VLR delivers a network name of a CS domain network, with which the UE registers, to the MME through an SGs interface. The MME informs the UE of the to-be-displayed network name by using the EMM Information message, and the UE displays the informed network name, where the network name informed by the MME is a network name that is of the HPLMN of the MME and is determined by the MME according to a policy of the MME, or a network name of the CS domain network with which the UE registers by using the MSC/VLR.

However, in the policy in which the network side delivers a network name to the UE for displaying, in some scenarios, the UE cannot determine a to-be-displayed network name, and the MME does not learn which network name is displayed on the UE either.

SUMMARY

In view of this, embodiments of the present invention provide a method and an apparatus for displaying a network name, to resolve a problem where in the prior art, a UE cannot determine which network name to display.

According to a first aspect, a method for displaying a network name is provided and includes registering, by a user equipment UE by using a combined attach procedure or a combined tracking area update procedure, with a long term evolution network and a first circuit switched domain network, and acquiring a public land mobile network identity PLMN ID of the long term evolution network and a PLMN ID of the circuit switched domain network. The method further includes displaying, by the UE, a first network name corresponding to a predetermined PLMN ID before a to-be-displayed second network name sent by a first network device on the long term evolution network is received. The predetermined PLMN ID is one of the PLMN ID of the long term evolution network and the PLMN ID of the circuit switched domain network.

In a first possible implementation manner of the first aspect, before the displaying, by the UE, a first network name corresponding to a predetermined PLMN ID, the method further includes determining, by the UE, whether a home PLMN ID is the same as the PLMN ID of the long term evolution network and the PLMN ID of the circuit switched domain network. The displaying, by the UE, a first network name corresponding to a predetermined PLMN ID includes: if the home PLMN ID is different from both the PLMN ID of the long term evolution network and the PLMN ID of the circuit switched domain network, displaying, by the UE, the first network name corresponding to the predetermined PLMN ID.

With reference to the first aspect or the first possible implementation manner of the first aspect, in a second possible implementation manner, after the displaying, by the UE, a first network name corresponding to a predetermined PLMN ID, the method further includes displaying, by the UE, the second network name sent by the first network device if the second network name sent by the first network device on the long term evolution network is received.

With reference to the first aspect or the first possible implementation manner of the first aspect, in a third possible implementation manner, after the displaying, by the UE, a first network name corresponding to a predetermined PLMN ID, the method further includes: during a process of executing a service on the long term evolution network, changing, by the UE, from the long term evolution network to the first circuit switched domain network or a second circuit switched domain network. The method further includes receiving, by the UE, a to-be-displayed third network name sent by a second network device, and keeping, by the UE, a currently displayed network name unchanged, or ignoring the third network name. The first circuit switched domain network and the second circuit switched domain network belong to a 2G network, and the second network device is a network device on the 2G network; or the first circuit switched domain network and the second circuit switched domain network belong to a 3G network, and the second network device is a network device on the 3G network.

With reference to the third possible implementation manner of the first aspect, in a fourth possible implementation manner, the service is a circuit switched fallback CSFB service, and the changing, by the service, from the long term evolution network to the first circuit switched domain network or a second circuit switched domain network includes: when the UE executes the CSFB service, falling back, by the UE, from the long term evolution network to the first circuit switched domain network or the second circuit switched domain network. Alternatively, the service is a voice service, and the changing, by the UE, from the long term evolution network to the first circuit switched domain network or a second circuit switched domain network includes: when the UE executes the voice service, handing over, by the UE, the voice service to the first circuit switched domain network or the second circuit switched domain network.

According to a second aspect, a method for displaying a network name is provided and includes: sending, by a network device by using a combined attach procedure or a combined tracking area update procedure, a public land mobile network identity PLMN ID of a long term evolution network and a PLMN ID of a circuit switched domain network to a user equipment UE, where the network device is a network device on the long term evolution network, and the long term evolution network and the circuit switched domain network are two networks with which the UE jointly registers by using the combined attach procedure or the combined tracking area update procedure. The method includes acquiring a configuration prestored by the network device, where the configuration is information of a first network name, the information of the first network name is a PLMN ID corresponding to a first network name displayed on the UE and/or the first network name displayed on the UE, the first network name displayed on the UE is the first network name corresponding to a predetermined PLMN ID, and the predetermined PLMN ID is one of the PLMN ID of the long term evolution network and the PLMN ID of the circuit switched domain network.

In a first possible implementation manner of the second aspect, before the acquiring a configuration prestored by the network device, the method further includes: determining, by the network device, whether a home PLMN ID of the UE is the same as the PLMN ID of the long term evolution network and the PLMN ID of the circuit switched domain network. The acquiring a configuration prestored by the network device includes: if the home PLMN ID is different from both the PLMN ID of the long term evolution network and the PLMN ID of the circuit switched domain network, acquiring the configuration prestored by the network device.

With reference to the second aspect or the first possible implementation manner of the second aspect, in a second possible implementation manner, after the acquiring a configuration prestored by the network device, the method further includes sending, by the network device if the network device determines that information of a second network name to be displayed on the UE needs to be sent to the UE. The information of the second network name to the UE, so that the UE displays a second network name corresponding to the information of the network name.

With reference to the first possible implementation manner of the second aspect, in a third possible implementation manner, that the network device determines whether information of a network name to be displayed on the UE needs to be sent to the UE includes: determining, by the network device, whether an operator to whom the PLMN ID of the LTE network belongs is the same as an operator to whom the PLMN ID of the circuit switched domain network belongs. The UE jointly registers with the LTE network and the circuit switched domain network; and if the operator to whom the PLMN ID of the LTE network belongs is different from the operator to whom the PLMN ID of the circuit switched domain network belongs, sending, by the network device, the network name to the UE.

With reference to the first or the second or the third possible implementation manner of the second aspect, in a third possible implementation manner, if the network device is a mobility management entity MME, the sending, by the network device, the information of the second network name to the UE includes: sending, by the MME by using a universal mobile telecommunication system territorial radio access network E-UTRAN mobile relationship information EMM information message, the information of the second network name to the UE.

According to a third aspect, a user equipment UE is provided and includes a receiving module configured to receive a public land mobile network identity PLMN ID of a long term evolution network and a PLMN ID of a first circuit switched domain network by executing a combined attach procedure or a combined tracking area update procedure, where the long term evolution network and the first circuit switched domain network are two networks with which the UE jointly registers by using the combined attach procedure or the combined tracking area update procedure. An instructing module is configured to: acquire the PLMN ID of the long term evolution network and the PLMN ID of the first circuit switched domain network that are received by the receiving module; before a to-be-displayed second network name sent by a first network device on the long term evolution network is acquired, acquire a first network name corresponding to a predetermined PLMN ID; and instruct a displaying module to display the first network name, where the predetermined PLMN ID is one of the PLMN ID of the long term evolution network and the PLMN ID of the first circuit switched domain network. The displaying module, configured to display the first network name instructed by the instructing module.

In a first possible implementation manner of the third aspect, the instructing module is specifically configured to acquire, in the following manner, the first network name corresponding to the predetermined PLMN ID: determine whether a home PLMN ID is the same as the PLMN ID of the long term evolution network and the PLMN ID of the first circuit switched domain network; and if the home PLMN ID is different from both the PLMN ID of the long term evolution network and the PLMN ID of the first circuit switched domain network, acquire the first network name corresponding to the predetermined PLMN ID.

With reference to the third aspect or the first possible implementation manner of the third aspect, in a second possible implementation manner, the user equipment further includes: a storing module, configured to: store different PLMN IDs and corresponding network names, and store the predetermined PLMN ID. The instructing module is specifically configured to acquire, in the following manner, a first network name corresponding to a predetermined PLMN ID: acquire the predetermined PLMN ID and the first network name corresponding to the predetermined PLMN ID from the storing module.

With reference to the third aspect or any one of the possible implementation manners of the third aspect, in a third possible implementation manner, the receiving module is further configured to receive the to-be-displayed second network name sent by the first network device on the long term evolution network; and the instructing module is further configured to: acquire the second network name received by the receiving module, and instruct the displaying module to display the second network name.

With reference to the third aspect or any one of the possible implementation manners of the third aspect, in a fourth possible implementation manner, the receiving module is further configured to: during a change from the long term evolution network to the first circuit switched domain network or a second circuit switched domain network, receive a third network name, where the first circuit switched domain network and the second circuit switched domain network belong to a 2G network or a 3G network, and the third network name is received from a second network device on the 2G network or the 3G network. The instructing module is further configured to: during a process of executing a service on the long term evolution network, change from the long term evolution network to the first circuit switched domain network or the second circuit switched domain network, acquire the third network name received by the receiving module, and keep a currently displayed network name unchanged, or ignore the third network name.

With reference to the fourth possible implementation manner of the third aspect, in a fifth possible implementation manner, the service is a circuit switched fallback CSFB service, and the instructing module is specifically configured to: during the process of executing the service on the long term evolution network, change from the long term evolution network to the first circuit switched domain network or the second circuit switched domain network in the following manner: when the CSFB service is executed, fall back from the long term evolution network to the first circuit switched domain network or the second circuit switched domain network. The service is a voice service, and the instructing module is specifically configured to: during the process of executing the service on the long term evolution network, change from the long term evolution network to the first circuit switched domain network or the second circuit switched domain network in the following manner: when the voice service is executed, hand over to the 2G network or the 3G network to execute the voice service.

According to a fourth aspect, a network device is provided and includes a sending module, configured to send a public land mobile network identity PLMN ID of a long term evolution network and a PLMN ID of a circuit switched domain network to a user equipment UE by using a combined attach procedure or a combined tracking area update procedure, where the network device is a network device on the long term evolution network, and the long term evolution network and the circuit switched domain network are two networks with which the UE jointly registers by using the combined attach procedure or the combined tracking area update procedure.

A storing module is configured to store a first configuration, where the first configuration is information of a first network name, the information of the first network name is a predetermined PLMN ID and/or a first network name corresponding to the predetermined PLMN ID, the first network name is a network name displayed on the UE according to a second configuration of the UE, the first configuration is the same as the second configuration, and the predetermined PLMN ID is one of the PLMN ID of the long term evolution network and the PLMN ID of the circuit switched domain network.

A network name processing module is configured to: acquire the first configuration stored by the storing module after the sending module sends the PLMN ID of the long term evolution network and the PLMN ID of the circuit switched domain network to the UE.

In a first possible implementation manner of the fourth aspect, the network name processing module is specifically configured to acquire, in the following manner, the first configuration stored by the storing module: determine whether a home PLMN ID of the UE is the same as the PLMN ID of the long term evolution network and the PLMN ID of the circuit switched domain network; and if the home PLMN ID is different from both the PLMN ID of the long term evolution network and the PLMN ID of the circuit switched domain network, acquire the first configuration stored by the storing module.

With reference to the fourth aspect or the first possible implementation manner of the fourth aspect, in a second possible implementation manner, the network name processing module is further configured to: determine whether an operator to whom the PLMN ID of the long term evolution network belongs is the same as an operator to whom the PLMN ID of the circuit switched domain network belongs; and if the operator to whom the PLMN ID of the long term evolution network belongs is different from the operator to whom the PLMN ID of the circuit switched domain network belongs, instruct the sending module to send information of a second network name. The sending module is further configured to send, to the UE, the information of the second network name instructed by the network name processing module.

With reference to the second possible implementation manner of the fourth aspect, in a third possible implementation manner, if the network device is a mobility management entity MME, the sending module is specifically configured to send the information of the second network name to the UE by using a universal mobile telecommunication system territorial radio access network E-UTRAN mobile management information EMM information message.

According to a fifth aspect, a user equipment UE is provided and includes: a receiver, configured to receive a public land mobile network identity PLMN ID of a long term evolution network and a PLMN ID of a first circuit switched domain network by executing a combined attach procedure or a combined tracking area update procedure, where the long term evolution network and the first circuit switched domain network are two networks with which the UE jointly registers by using the combined attach procedure or the combined tracking area update procedure. A processor is configured to: acquire the PLMN ID of the long term evolution network and the PLMN ID of the circuit switched domain network that are received by the receiver; before a to-be-displayed second network name sent by a first network device on the long term evolution network is acquired, acquire a first network name corresponding to a predetermined PLMN ID; and instruct a display screen to display the first network name, where the predetermined PLMN ID is one of the PLMN ID of the long term evolution network and the PLMN ID of the circuit switched domain network. The display screen is configured to display the first network name instructed by the processor.

In a first possible implementation manner of the fifth aspect, the processor is specifically configured to acquire, in the following manner, the first network name corresponding to the predetermined PLMN ID: determine whether a home PLMN ID is the same as the PLMN ID of the long term evolution network and the PLMN ID of the circuit switched domain network; and if the home PLMN ID is different from both the PLMN ID of the long term evolution network and the PLMN ID of the circuit switched domain network, acquire the first network name corresponding to the predetermined PLMN ID.

With reference to the fifth aspect or the first possible implementation manner of the fifth aspect, in a second possible implementation manner, the user equipment further includes a memory, configured to: store different PLMN IDs and corresponding network names, and store the predetermined PLMN ID. The processor is specifically configured to acquire, in the following manner, a first network name corresponding to a predetermined PLMN ID: acquire the predetermined PLMN ID and the first network name corresponding to the predetermined PLMN ID from the memory.

With reference to the fifth aspect or any one of the possible implementation manners of the fifth aspect, in a third possible implementation manner, the receiver is further configured to receive the second network name sent by the first network device on the long term evolution network. The processor is further configured to: acquire the second network name received by the receiver, and instruct the display screen to display the second network name.

With reference to the fifth aspect or any one of the possible implementation manners of the fifth aspect, in a fourth possible implementation manner, the receiver is further configured to: during a change from the long term evolution network to the first circuit switched domain network or a second circuit switched domain network, receive a third network name, where the first circuit switched domain network and the second circuit switched domain network belong to a 2G network or a 3G network, and the third network name is received from a second network device on the 2G network or the 3G network. The processor is further configured to: during a process of executing a service on the long term evolution network, and during the change from the long term evolution network to the first circuit switched domain network or the second circuit switched domain network, acquire the third network name received by the receiver, and keep a currently displayed network name unchanged, or ignore the third network name.

With reference to the third possible implementation manner of the fifth aspect, in a fourth possible implementation manner, the service is a circuit switched fallback CSFB service, and the processor is specifically configured to: during the process of executing the service on the long term evolution network, change from the long term evolution network to the first circuit switched domain network or the second circuit switched domain network in the following manner: when the CSFB service is executed, fall back from the long term evolution network to the first circuit switched domain network or the second circuit switched domain network.

Alternatively, the service is a voice service, and the processor is specifically configured to: during the process of executing the service on the long term evolution network, change from the long term evolution network to the first circuit switched domain network or the second circuit switched domain network in the following manner: when the voice service is executed, hand over, by using a network device on the long term evolution network, to the 2G network or the 3G network to execute the voice service.

In the foregoing solutions, after a UE acquires a PLMN ID of an LTE network and a PLMN ID of a CS domain network, and if a network name informed by a network device on the LTE network or the CS domain network is not received by the UE, the UE displays a network name corresponding to a predetermined PLMN ID, i.e., one of the PLMN ID of the LTE network and the PLMN ID of the CS domain network, thereby resolving a problem where after a CSFB combined attach process or a CSFB combined location update process, a UE does not determine which network name to display, and standardizing a method for displaying a network name on a terminal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments, and a person skilled in the art may still derive other drawings from these accompanying drawings.

DETAILED DESCRIPTION OF ILLUSTRATIVE EMBODIMENTS

Figure 1:
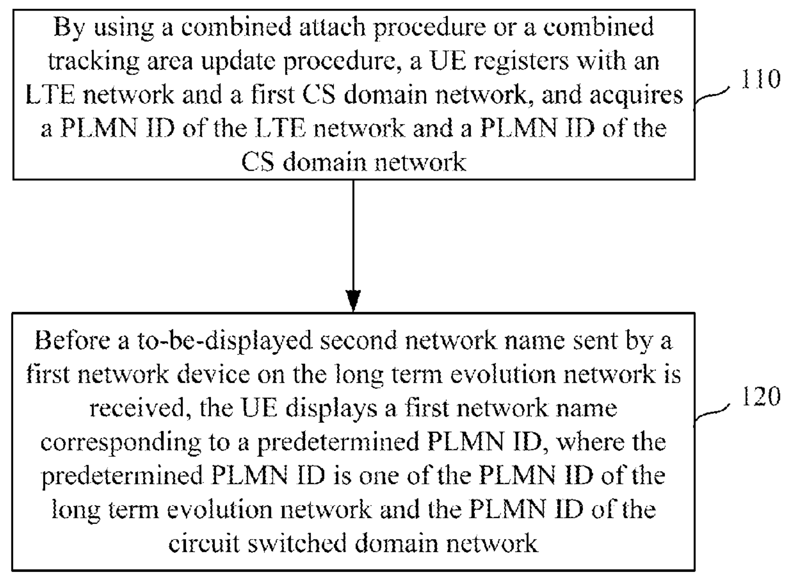
FIG. 1 is a flowchart of a method for displaying a network name according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

An embodiment of the present invention provides a method for displaying a network name.

It should be noted that a same concept and a same scenario in all embodiments of the present invention may be applied to another embodiment, and details of each embodiment are not described in the embodiments of the present invention.

In the foregoing policy 1 in which a UE displays a network name, when the UE executes a combined attach procedure or a combined tracking area update procedure, or after the UE executes a combined attach procedure or a combined tracking area update procedure, the UE acquires a PLMN ID of an LTE network and a PLMN ID, which is selected by an MME, of a CS domain network; however, the PLMN ID of the LTE network and the PLMN ID of the CS domain network may be different; in this case, the UE does not learn whether to display a network name according to the PLMN ID of the LTE network or according to the PLMN ID of the CS domain network. For example, when an LTE network and a CS domain network belong to different operators, the UE does not learn whether to display a network name according to a PLMN ID of the LTE network or according to a PLMN ID of the CS domain network; or when a PLMN ID of an LTE network and a PLMN ID of a CS domain network are different, but the LTE network and the CS domain network belong to a same operator, the UE needs to display, according to a PLMN ID, whether a network is the LTE network or the CS domain network.

It should be noted that CS domain networks in all the embodiments of the present invention may include a 2G network or a 3G network or a 1xRTT network of a code division multiple access (CDMA) network.

In the combined attach procedure, the UE receives an attach accept message sent by an MME, to acquire a tracking area identity list (TAI List), a location area identity (LAI), and a globally unique temporary UE identity (GUTI), where the TAI list and the GUTI include a PLMN ID of an LTE network with which the UE registers, and the LAI includes a PLMN ID of a CS domain network with which the UE registers, so that the UE acquires the PLMN ID of the LTE network and the PLMN ID of the CS domain network.

In the combined tracking area update procedure, the UE receives a tracking area update accept message sent by an MME, to acquire a TAI list, an LAI, and a GUTI, where the TAI list and the GUTI include a PLMN ID of an LTE network with which the UE registers, the LAI includes a PLMN ID of a CS domain network with which the UE registers, so that the UE acquires the PLMN ID of the LTE network and the PLMN ID of the CS domain network.

If the PLMN ID of the LTE network and the PLMN ID of the CS domain network acquired by the UE are different, in this case, the UE does not learn whether to display a network name according to the PLMN ID of the LTE network or according to the PLMN ID of the CS domain network.

For the foregoing situation, the method in this embodiment is shown in FIG. 1, including the following steps:

Step 110: By using a combined attach procedure or a combined tracking area update procedure, a UE registers with an LTE network and a first CS domain network, and acquires a PLMN ID of the LTE network and a PLMN ID of the CS domain network.

A method for executing the combined attach procedure by the UE and a method for executing the tracking area update procedure by the UE are the same as those in the prior art, and details are not described herein again. It should be noted that the combined attach procedure or the combined tracking area update procedure is completed by the UE by performing interaction with a network device such as an MME on the LTE network and a network device such as an MSC server on the CS domain network. To describe an execution body in each step more clearly, this specification briefly describes each step as executed by a single device.

In this step, when executing the combined attach procedure, the UE can acquire the PLMN ID of the LTE network and the PLMN ID of the CS domain network by using an attach accept message; when executing the combined tracking area update procedure, the UE can acquire the PLMN ID of the LTE network and the PLMN ID of the CS domain network by using a TAU accept message.

It should be noted that an LTE network is used as an example in all embodiments of the present invention. Actually, the embodiments of the present invention are not limited to an LTE network, and may also include another pure PS domain network. An executing method is the same as that in this embodiment of the present invention.

Step 120: Before a to-be-displayed second network name sent by a first network device on the long term evolution network is received, the UE displays a first network name corresponding to a predetermined PLMN ID, where the predetermined PLMN ID is one of the PLMN ID of the long term evolution network and the PLMN ID of the circuit switched domain network.

For example, before the UE receives a to-be-displayed network name sent by a network device, the UE displays a network name corresponding to the PLMN ID, which is predetermined, of the LTE network, or before the UE receives a to-be-displayed network name sent by a network device, the UE displays a network name corresponding to the PLMN ID, which is predetermined, of the CS domain network.

In this case, even if the UE acquires the PLMN ID of the LTE network and the PLMN ID of the CS domain network at the same time, the UE can also display, according to a preset rule, a network name corresponding to a predetermined PLMN ID.

It should be noted that the first network name and the second network name in this step may be same, or may also be different. Herein, it is noted that the first network name is a network name displayed on the UE according to a setting, which is performed in advance, of the UE, and the second network name is a network name received from a network device.

In this embodiment of the present invention, after a UE acquires a PLMN ID of an LTE network and a PLMN ID of a CS domain network, and if a network name informed by a network device on the LTE network or the CS domain network is not received by the UE, the UE displays a network name corresponding to a predetermined PLMN ID, that is, one of the PLMN ID of the LTE network and the PLMN ID of the CS domain network, thereby resolving a problem where after a CSFB combined attach process or a CSFB combined location update process, a UE does not determine which network name to display, and standardizing a method for display a network name on a terminal.

In this embodiment of the present invention, that before information of a second network name to be displayed, which is sent by a first network device on the long term evolution network, is received means that the UE has not received a to-be-displayed network name sent by a network device.

In this step, a first network name that is corresponding to a predetermined PLMN ID and displayed by the UE is a network name displayed by the UE according to the preset rule.

For example, if the preset rule is that: if the UE acquires the PLMN ID of the LTE network and the PLMN ID of the CS domain network, the UE displays a network name corresponding to the PLMN ID of the LTE network; and in this step, the UE displays, according to the preset rule, the network name corresponding to the PLMN ID of the LTE network.

If the preset rule is that: if the UE acquires the PLMN ID of the LTE network and the PLMN ID of the CS domain network, the UE displays a network name corresponding to the PLMN ID of the CS domain network; and in this step, the UE displays, according to the preset rule, the network name corresponding to the PLMN ID of the CS domain network.

Optionally, that the UE displays a network name according to the preset rule may include: separately determining, by the UE, whether an HPLMN ID is the same as the PLMN ID of the LTE network and the PLMN ID of the CS domain network. If the HPLMN ID is the same as the PLMN ID of the LTE network, displaying the network name corresponding to the PLMN ID of the LTE network. If the HPLMN ID is the same as the PLMN ID of the CS domain network, displaying the network name corresponding to the PLMN ID of the CS domain network. And, if the HPLMN ID is different from both the PLMN ID of the LTE network and the PLMN ID of the CS domain network, displaying the network name corresponding to the predetermined PLMN ID.

When the UE determines whether the HPLMN ID is the same as the PLMN ID of the LTE network and the PLMN ID of the CS domain network, a determining sequence may be random. For example, the UE may first determine whether the HPLMN ID is the same as the PLMN ID of the LTE network, and then determine whether the HPLMN ID is the same as the PLMN ID of the CS domain network; the UE may also first determine whether the HPLMN ID is the same as the PLMN ID of the CS domain network, and then determine whether the HPLMN ID is the same as the PLMN ID of the LTE network, which is not limited in this embodiment of the present invention.

Optionally, the UE may prestore a correspondence between each PLMN ID and a network name. Certainly, this embodiment of the present invention is not limited to this, and the UE may further acquire, in another manner, a network name corresponding to a PLMN ID. For example, after acquiring a PLMN ID, the UE acquires a network name corresponding to the PLMN ID from a network device.

Figure 1A:
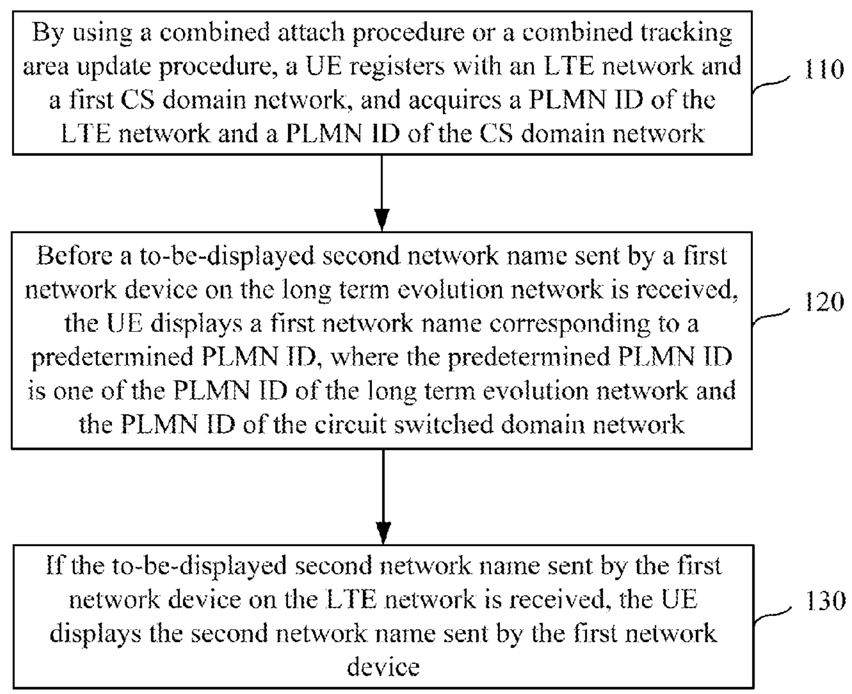
FIG. 1*a* is a flowchart of a method for displaying a network name according to another embodiment of the present invention.

Further, as shown in FIG. 1*a*, this embodiment of the present invention may further include the following.

Step 130: If the to-be-displayed second network name sent by the first network device on the LTE network is received, the UE displays the second network name sent by the first network device.

This embodiment of the present invention ensures that a network name displayed on a terminal is consistent with a network name, displayed on a UE, which is recorded by a network device.

Figure 1B:
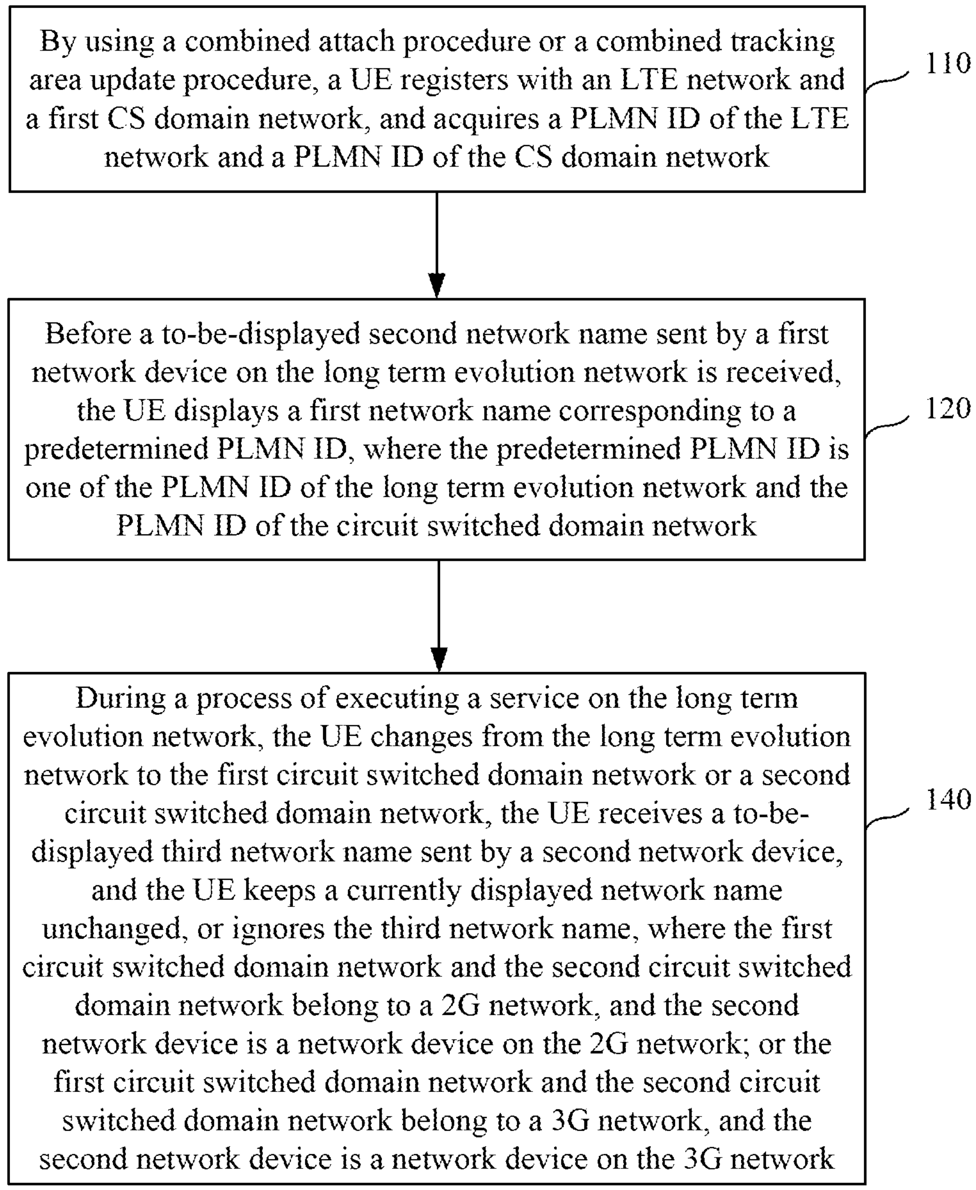
FIG. 1*b* is a flowchart of a method for displaying a network name according to another embodiment of the present invention.

Further, as shown in FIG. 1*b*, this embodiment of the present invention may further include the following.

Step 140: During a process of executing a service on the long term evolution network, the UE changes from the long term evolution network to the first circuit switched domain network or a second circuit switched domain network, the UE receives a to-be-displayed third network name sent by a second network device, and the UE keeps a currently displayed network name unchanged, or ignores the third network name, where the first circuit switched domain network and the second circuit switched domain network belong to a 2G network, and the second network device is a network device on the 2G network; or the first circuit switched domain network and the second circuit switched domain network belong to a 3G network, and the second network device is a network device on the 3G network.

Specifically, during a process of executing a CSFB service by the UE, the UE falls back to the CS domain network; or during a process of executing a voice service, the UE is handed over to the 2G network or the 3G network, the UE receives the to-be-displayed network name sent by the network device on the 2G network or the 3G network to which the CS domain network belongs, and the UE keeps the currently displayed network name unchanged, or ignores the received to-be-displayed network name. For details, refer to descriptions in the following embodiments.

For example, during a process of executing the CSFB service by the UE on the LTE network, the UE falls back to the CS domain network, and receives a to-be-displayed network name sent by a network device, and the UE ignores the received network name and displays a previously displayed network name.

For another example, during a process of executing the voice service by the UE on the LTE network, the UE is handed over to a PS domain network on the 2G network or the 3G network or is handed over to the CS domain network on the 2G network or the 3G network, and receives a to-be-displayed network name sent by a network device, and the UE ignores the received network name and displays a previously displayed network name.

This embodiment of the present invention ensures that a network name displayed on a terminal is consistent with a network name, displayed on a UE, which is recorded by a network device, and avoids a problem where a network name displayed on the UE changes during an executing process, thereby ensuring consistency of the network name displayed on the UE with the network name recorded by the network device, and enhancing user experience.

Figure 2:
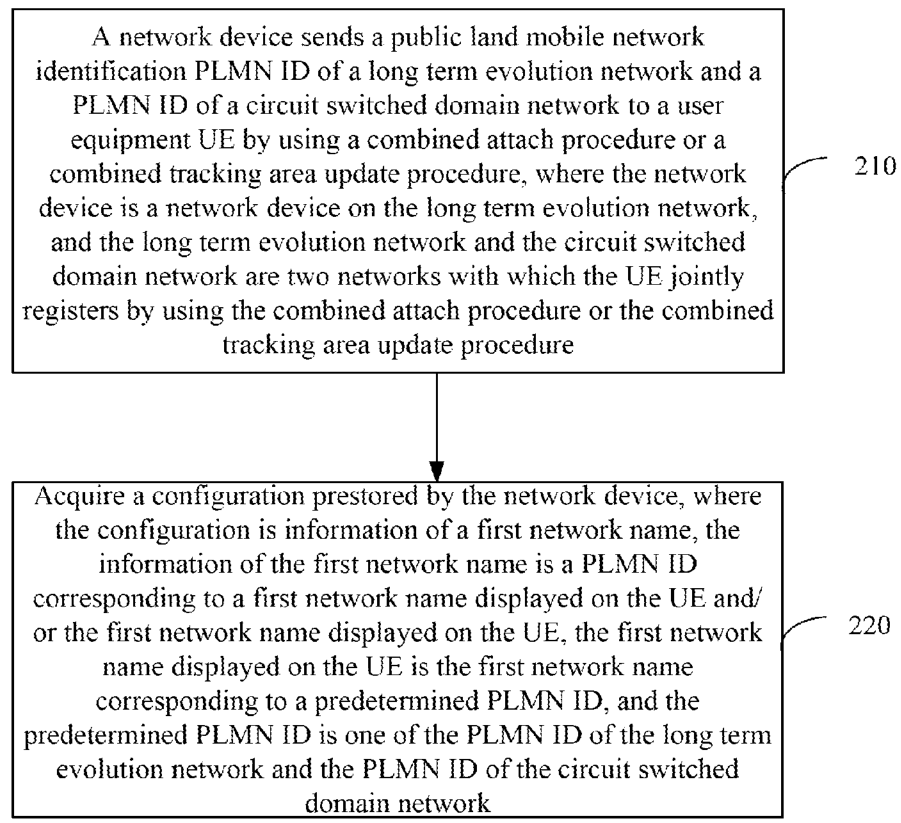
FIG. 2 is a flowchart of a method for displaying a network name according to another embodiment of the present invention.

Accordingly, another embodiment of the present invention further provides a method for displaying a network name for the network device in the foregoing embodiment. As shown in FIG. 2, this embodiment includes the following steps.

Step 210: A network device sends a public land mobile network identity PLMN ID of a long term evolution network and a PLMN ID of a circuit switched domain network to a user equipment UE by using a combined attach procedure or a combined tracking area update procedure, where the network device is a network device on the long term evolution network, and the long term evolution network and the circuit switched domain network are two networks with which the UE jointly registers by using the combined attach procedure or the combined tracking area update procedure.

Step 220: Acquire a configuration prestored by the network device, where the configuration is information of a first network name, the information of the first network name is a PLMN ID corresponding to a first network name displayed on the UE and/or the first network name displayed on the UE, the first network name displayed on the UE is the first network name corresponding to a predetermined PLMN ID, and the predetermined PLMN ID is one of the PLMN ID of the long term evolution network and the PLMN ID of the circuit switched domain network.

To make a network name displayed on a UE consistent with a network name that is displayed on the UE and is recorded by a network device, a setting may be performed in advance on the network device, and the setting is the same as a preset rule of the UE, so that the network name that is displayed on the UE and is recorded by the network device is consistent with a network name actually displayed on the UE. This embodiment of the present invention ensures that a network name displayed on a terminal is consistent with a network name, displayed on a UE, which is recorded by a network device, and enhances user experience.

Figure 2A:
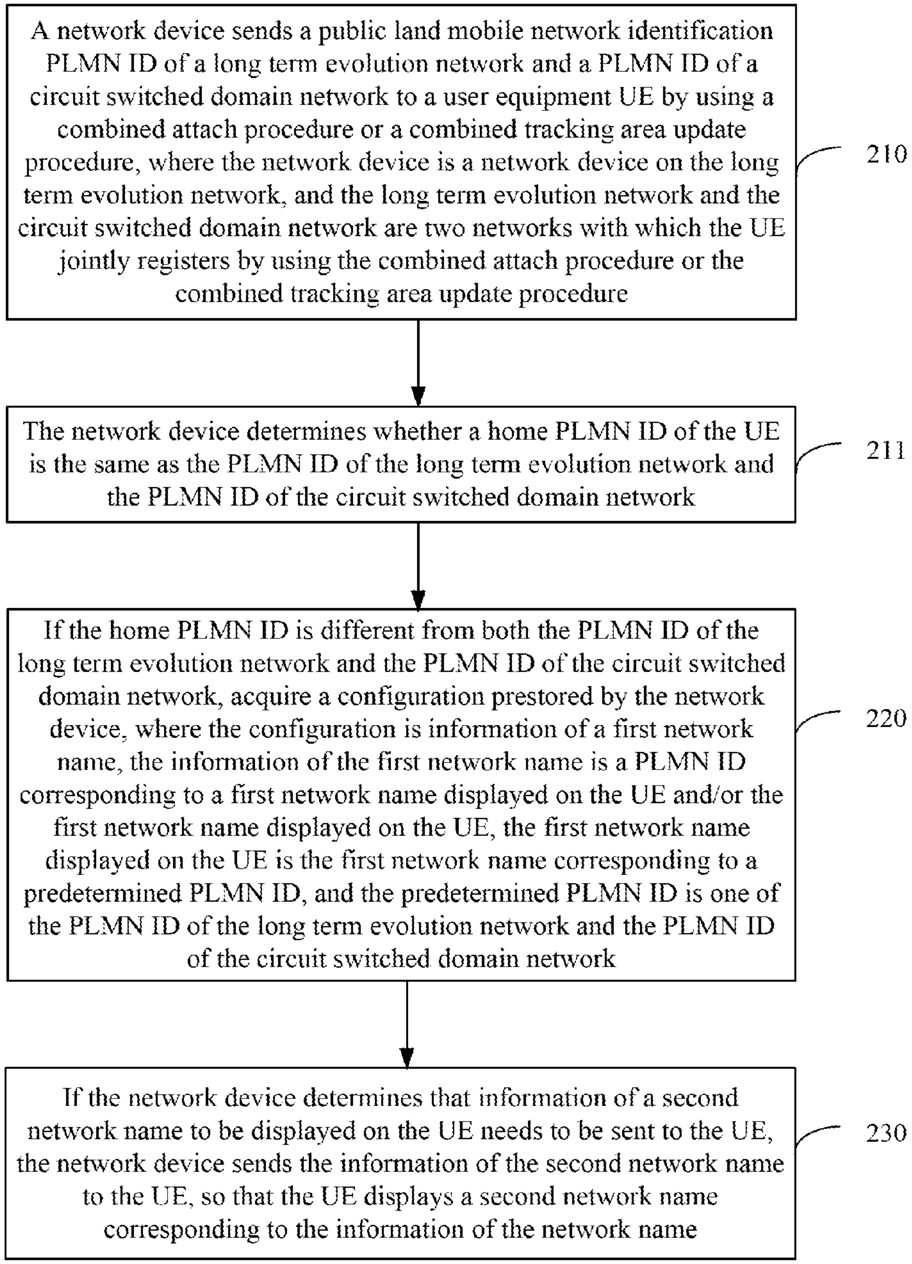
FIG. 2*a* is a flowchart of a method for displaying a network name according to another embodiment of the present invention.

In this embodiment, before the acquiring a configuration prestored by the network device, as shown in FIG. 2*a*, the method may further include:

Step 211: The network device determines whether a home PLMN ID of the UE is the same as the PLMN ID of the long term evolution network and the PLMN ID of the circuit switched domain network.

The acquiring a configuration prestored by the network device includes: if the home PLMN ID is different from both the PLMN ID of the long term evolution network and the PLMN ID of the circuit switched domain network, acquiring the configuration prestored by the network device.

Further, as shown in FIG. 2*a*, the method in this embodiment may further include:

Step 230: If the network device determines that information of a second network name to be displayed on the UE needs to be sent to the UE, the network device sends the information of the second network name to the UE, so that the UE displays a second network name corresponding to the information of the network name.

The determining, by the network device, whether information of a second network name to be displayed on the UE needs to be sent to the UE may include determining, by the network device, whether an operator to whom the PLMN ID of the LTE network belongs is the same as an operator to whom the PLMN ID of the circuit switched domain network belongs, where the UE jointly registers with the LTE network and the circuit switched domain network; and if the operator to whom the PLMN ID of the LTE network belongs is different from the operator to whom the PLMN ID of the circuit switched domain network belongs, sending, by the network device, the network name to the UE.

It should be noted that in this embodiment, the network device on the LTE network may be an MME, and the UE may receive EMM information sent by the network device, to receive the information of the to-be-displayed network name. In this case, if the MME does not send the EMM information to the UE, the MME also has a preset rule that is the same as that of the UE; therefore, the MME can learn whether a PLMN ID corresponding to the network name displayed on the UE is the PLMN ID of the LTE network or the PLMN ID of the CS domain network.

Another embodiment of the present invention provides a method for displaying a network name.

In the foregoing policy 2, an EMM Information message sent by an MME is an optional message, that is, the MME may not send the EMM Information message to a UE. However, if the MME does not send the EMM Information message to the UE, the MME does not learn whether a network name displayed on the UE is a network name corresponding to a PLMN ID of an LTE network or a network name corresponding to a PLMN ID of a CS domain network.

In another aspect, when the UE performs a VoIP service on a 3G network (for example, a high speed uplink packet access (HSPA) network), the UE is handed over to the LTE network. In this case, when a user dials or receives or triggers the VoIP service, a network name displayed on the UE is a network name of the 3G network; therefore, the user determines, according to the network name currently displayed on the UE, that a current reside-in or serving network is the 3G network. However, during a process of executing the VoIP service, if the UE executes PS handover (HO) to be handed over to the LTE network, the UE executes a combined tracking area update procedure on the LTE network, the UE receives an EMM information message sent by an MME on the LTE network, and the UE displays a network name informed by the EMM information message. If the network name of the 3G network is different from the network name informed by the EMM Information message, user experience may be compromised, thereby causing a complaint. Therefore, to avoid this problem, during the process of executing the VoIP service, a change, which is caused by PS HO execution, of a network name displayed on the UE needs to be avoided.

Alternatively, when the UE executes a voice service in a CS domain on a 2G network or a 3G network, a network name displayed on the UE may be a network name of the 2G network or the 3G network. However, during a continuous process of executing the voice service, reverse single radio voice call continuity (rSRVCC) needs to be executed and the UE needs to be handed over to the LTE network or the 3G network. In this case, the UE displays a corresponding network name according to the PLMN ID of the currently used LTE network or a PLMN ID of the currently used 3G network, or if the UE receives a GMM information message sent by an SGSN on the 3G network or an EMM information message sent by an MME on the LTE network, the UE displays a network name informed by the GMM Information message or the EMM information message. In this case, a network name displayed when the UE triggers the voice service in the CS domain may be inconsistent with a network name displayed when the UE is handed over to the LTE network or the 3G network.

Figure 3:
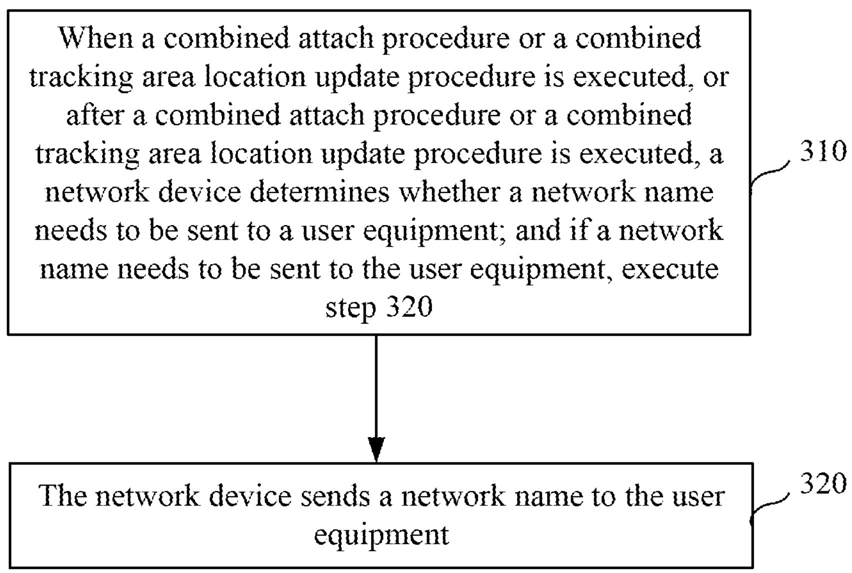
FIG. 3 is a flowchart of a method for displaying a network name according to another embodiment of the present invention.

To resolve the foregoing problem, the method in this embodiment is shown in FIG. 3, including the following steps:

Step 310: When a combined attach procedure or a combined tracking area update procedure is executed, or after a combined attach procedure or a combined tracking area location update procedure is executed, a network device determines whether a network name needs to be sent to a user equipment; and if a network name needs to be sent to the user equipment, execute step 320.

This step specifically includes: determining, by the network device, whether an operator to whom a PLMN ID of an LTE network belongs is the same as an operator to whom a PLMN ID of a CS domain network belongs; and if the operator to whom the PLMN ID of the LTE network belongs is different from the operator to whom the PLMN ID of the CS domain network belongs, sending, by the network device, a network name to the UE, and executing step 320; or this step specifically includes: determining, by the network device, whether the UE is handed over to an LTE network during a process of executing a voice service; and if the UE is handed over to an LTE network during a process of executing a voice service sending, by the network device, a network name to the UE, and executing step 320.

Step 320: The network device sends a network name to the user equipment.

In this step, if the network device determines that during the process of executing the voice service, the UE is handed over to the LTE network or a 3G network, in this step, the network device sends the network name to the UE, where the network name is a network name of a 3G network on which the UE is located when starting the voice service.

In this way, the UE can display a network name according to a received network name, and the received network name is consistent with the network name when the UE starts the voice service, thereby avoiding a change of a displayed network name.

In addition, if the operator to whom the PLMN ID of the LTE network belongs is different from the operator to whom the PLMN ID of the CS domain network belongs, the network device sends a network name to the UE, where the network name may be a network name corresponding to a home PLMN ID of the network device, may also be a network name corresponding to the PLMN ID of the LTE network, or may further be a network name corresponding to the PLMN ID of the CS domain network.

Specifically, the network device may be an MME, and the MME may send a network name to the user equipment by using an EMM information message. Certainly, the network device may also send a network name to the user equipment by using another message.

This embodiment differs from the prior art in that, if the MME determines that the operator to whom the PLMN ID of the LTE network belongs is different from the operator to whom the PLMN ID of the CS domain network belongs, the EMM information message is a message that must be sent, but not an optional message.

Further, in this embodiment, if the operator to whom the PLMN ID of the LTE network belongs is the same as the operator to whom the PLMN ID of the CS domain network belongs, the MME may send the EMM information message to the UE, or may also not send the EMM information message to the UE. That is, if the operator to whom the PLMN ID of the LTE network belongs is the same as the operator to whom the PLMN ID of the CS domain network belongs, the EMM information message is an optional message.

In this embodiment of the present invention, if an MME determines that an operator to whom a PLMN ID of an LTE network belongs is different from an operator to whom a PLMN ID of a CS domain network belongs, the MME sends an EMM Information message to a UE, and the message is a message that must be sent, thereby avoiding a problem where during or after a process of executing a CSFB combined attach procedure and a CSFB combined tracking area update procedure, the UE cannot determine which network name to display, and ensuring consistency between a network name displayed on a terminal and a network name, displayed on the UE, which is recorded by a network device. In this way, a problem where a network name displayed on the UE changes during an executing process is avoided, consistency of network names displayed on the UE is ensured, and user experience is enhanced.

Another embodiment of the present invention provides a method for displaying a network name.

In the prior art, after a UE attaches to an LTE network, a network name displayed on the UE is a network name of the LTE network. However, when a CSFB service triggers the UE to fall back to a 2G network or a 3G network, the UE displays a network name of the 2G network or the 3G network in which the UE currently resides; or if the UE falls back to a 2G network or a 3G network, and the UE receives a GPRS mobile management information (GMM information) message sent by an SGSN on the 2G network or the 3G network, or if the UE receives a mobile management information (MM Information) message sent by an MSC/VLR on the 2G network or the 3G network, the UE displays a network name informed by the GMM information message or the MM information message.

Alternatively, in the prior art, when a UE performs a voice over Internet Protocol (VoIP) service on a 3G network, the UE is handed over to an LTE network. In this case, when a user dials or receives or triggers the VoIP service, a network name displayed on the UE is a network name of the 3G network; therefore, the user determines, according to the network name currently displayed on the UE, that a current reside-in network or a network serving the UE is the 3G network. However, if during a process of executing the VoIP service, the UE executes PS handover to be handed over to the LTE network, and executes a combined tracking area update procedure on the LTE network, the UE displays a network name informed by received EMM information, or if EMM information is not received by the UE, the UE displays a network name of a network on which the UE is currently located.

However, if a network name displayed after the UE attaches to the LTE network is inconsistent with a network name displayed when the UE falls back to a 2G network or a 3G network, or if network names displayed during a process of executing the VoIP service on the UE are inconsistent, user experience becomes very poor, and a complaint is easily lodged from a user.

For example, during a process of executing a CSFB service, when a user dials or receives or triggers the CSFB service, a network name displayed on the UE may be a network name of an LTE network. However, when the UE falls back to a 2G network, the UE displays a corresponding network name according to a PLMN ID of a currently used 2G network; or when the UE falls back to a 3G network, the UE displays a corresponding network name according to a PLMN ID of a currently used 3G network. Alternatively, if the UE receives a GMM information message sent by an SGSN on a 2G network or a 3G network, or the UE receives an MM information message sent by an MSC/VLR on a 2G network or a 3G network, the UE displays a network name informed by the GMM information message or the MM information message. In this case, a network name displayed when the UE dials or receives or triggers the CSFB service may be inconsistent with a network name displayed when the UE falls back to the 2G network or the 3G network.

For another example, after the UE triggers a VoIP service on an LTE network, a user determines, according to a network name currently displayed on the UE, a network in which the UE currently resides or a network currently serving the UE. In this case, a network name displayed on the UE may be a network name of the LTE network. However, during a process of executing the VoIP service, single radio voice call continuity (SRVCC) needs to be executed and the UE needs to be handed over to a 2G network or a 3G network. In this case, the UE displays a corresponding network name according to a PLMN ID of a currently used 2G network or 3G network; or if the UE receives a GMM information message sent by an SGSN on the 2G network or the 3G network, or if the UE receives an MM information message sent by an MSC/VLR on the 2G network or the 3G network, the UE displays a network name informed by the GMM information message or the MM information message. In this case, a network name displayed when the UE triggers the VoIP service may be inconsistent with a network name displayed when the UE falls back to the 2G network or the 3G network.

For another example, when the UE executes a voice service in a CS domain on a 2G network or a 3G network, a network name displayed on the UE may be a network name of the 2G network or the 3G network. However, during a continuous process of executing the voice service, reverse single radio voice call continuity (rSRVCC) needs to be executed and the UE needs to be handed over to an LTE network or a 3G (for example, HSPA) network. In this case, the UE displays a corresponding network name according to a PLMN ID of a currently used LTE network or 3G network; or if the UE receives a GMM information message sent by an SGSN on the 3G network or an EMM information message sent by an MME on the LTE network, or if the UE receives an MM information message sent by an MSC/VLR on the 3G network, the UE displays a network name informed by the GMM information message, the EMM information message, or the MM information message. In this case, a network name displayed when the UE triggers the voice service in the CS domain may be inconsistent with a network name displayed when the UE is handed over to the LTE network or the 3G network.

For another example, when the UE executes a voice service in a CS domain on a 2G network or a 3G network, a network name displayed on the UE may be a network name of the 2G network or the 3G network. However, during a process of executing the voice service, the UE needs to execute CS handover (CS HO), so as to be handed over to another 2G network or 3G network. In this case, the UE displays a corresponding network name according to a PLMN ID of a 2G network or a 3G network used after handover; or if the UE receives a GMM information message sent by an SGSN/MME on the 2G network or the 3G network, or if the UE receives an MM information message sent by an MSC/VLR on the 2G network or the 3G network, the UE displays a network name informed by the GMM information message or the MM information message. In this case, a network name displayed when the UE triggers the voice service in the CS domain may be inconsistent with a network name displayed when the UE is handed over to the another 2G or 3G network.

Figure 4:
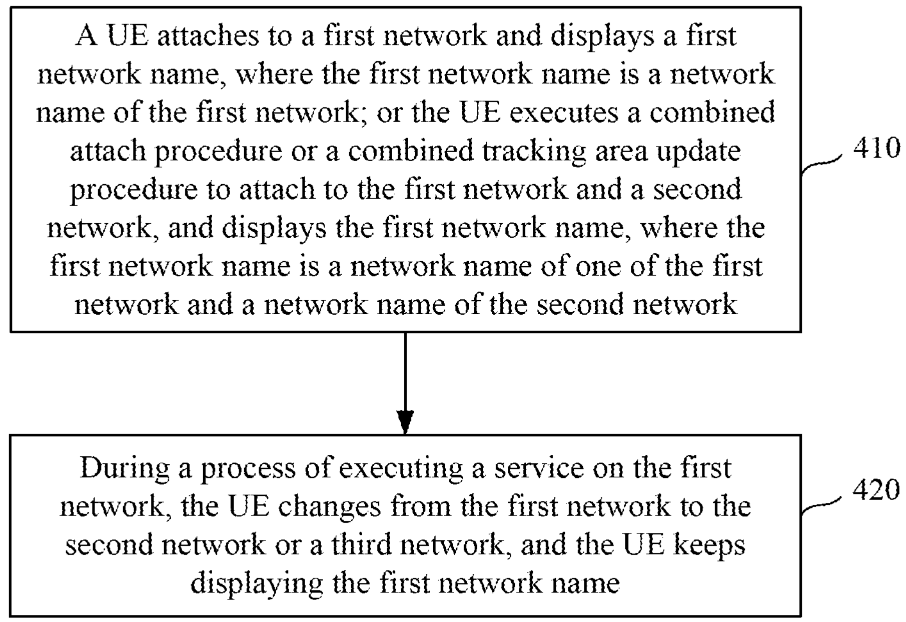
FIG. 4 is a flowchart of a method for displaying a network name according to another embodiment of the present invention.

For the foregoing situation, the method in this embodiment is shown in FIG. 4, including the following steps:

Step 410: A UE attaches to a first network and displays a first network name, where the first network name is a network name of the first network; or the UE executes a combined attach procedure or a combined tracking area update procedure to attach to the first network and a second network, and displays a first network name, where the first network name is a network name of the first network or a network name of the second network.

In this step, either of the first network and the second network may be an LTE network or a CS domain network, where the CS domain network belongs to a 2G network or a 3G network. For a method for attaching to an LTE network or a 2G network or a 3G network by the UE and a method for executing combined attach procedure by the UE to attach to the first network and the second network, refer to methods in the prior art, and details are not described herein again in this embodiment of the present invention. If the UE attaches only to the first network, the first network name is the network name of the first network; if the UE jointly attaches to the first network and the second network, the first network name may be the network name of the first network, or may also be the network name of the second network.

For example, if the UE attaches only to an LTE network, the first network is the LTE network, and the first network name displayed on the UE is a network name of the LTE network; if the UE attaches only to a 2G network or a 3G network, the first network is the 2G network or the 3G network to which the UE attaches, and the first network name displayed on the UE is a corresponding network name of the 2G network or the 3G network; if the UE jointly attaches to an LTE network and a CS domain network, the first network is one of the LTE network and the CS domain network, the second network is the other of the LTE network and the CS domain network, and the first network name displayed on the UE may be a network name of the LTE network, or may also be a network name of the CS domain network; and if the UE jointly attaches to a 2G network and a 3G network, the first network is one of the 2G network and the 3G network, the second network is the other of the 2G network and the 3G network, and the first network name displayed on the UE may be a network name of the 2G network, or may also be a network name of the 3G network.

Step 420: During a process of executing a service by the UE on the first network, the UE changes from the first network to the second network or a third network, and the UE keeps displaying the first network name.

The third network may be an LTE network or a CS domain network, and is different from the first network.

In this step, for example, if the first network is an LTE network, during a process of executing a service, the UE is handed over from the first network or falls back from the first network to the second network or the third network; for example, when executing a CSFB service, the UE falls back to the third network, or when executing a voice service, the UE executes an SRVCC handover process or a PS HO handover process to be handed over to the third network, and the UE displays the first network name. Therefore, in this embodiment, the UE falls back from the LTE network or is handed over from the LTE network to the 2G network or the 3G network, and after handover or fallback, the UE still keeps displaying the first network name instead of displaying a second network name, where the second network name is a network name of the third network or the second network.

For example, after the UE jointly attaches to an LTE network and a first CS domain network, the displayed first network name may be a network name of the LTE network or a network name of the first CS domain network. In this case, when a user dials or receives or triggers a CSFB service, the user determines, according to a network name currently displayed on the UE, a current reside-in network or a network currently serving the UE, and in this case, a network name displayed on the UE is the first network name. When the UE falls back to a second CS domain network, during CSFB service execution, a change, which is caused by the CSFB service execution, of a network name displayed on the UE needs to be avoided; therefore, the UE keeps displaying the first network name, thereby enhancing user experience, where the first CS domain network and the second CS domain network may be the same, or may also be different.

For another example, when the UE triggers a VoIP service on an LTE network, a displayed network name is a network name of the LTE network. If SRVCC needs to be executed, for example, when a signal of the VoIP service is interrupted, SRVCC needs to be executed and the UE needs to be handed over to a 2G network or a 3G network. In this case, a change, which is caused by SRVCC execution, of a network name displayed on the UE needs to be avoided; therefore, the UE keeps displaying the network name of the LTE network, to enhance user experience.

For another example, when the UE triggers a VoIP service on an LTE network, a displayed network name is a network name of the LTE network. If PS handover needs to be executed and the UE needs to be handed over to a 3G (for example, HSPA) network, in this case, a change, which is caused by PS handover execution, of a network name displayed on the UE needs to be avoided; therefore, the UE keeps displaying the network name of the LTE network, to enhance user experience.

Specifically, after the UE attaches to an LTE network, if the UE falls back to or is handed over to a 2G network or a 3G network, and receives a GMM information message sent by an SGSN on the 2G network or the 3G network, or receives an MM information message sent by an MSC/VLR, the UE does not change a previously displayed network name, that is, the UE ignores a network name informed by the GMM information or the MM information; or if the UE falls back to or is handed over to a 2G network or a 3G network, the UE does not display a network name according to a PLMN ID of the 2G network or the 3G network in which the UE resides.

A CSFB service includes a voice service, a location service (LCS), and a call independent supplementary service (CISS).

For another example, when the UE performs a VoIP service on a 3G network, the UE is handed over to an LTE network. In this case, when a user dials or receives or triggers the VoIP service, a network name displayed on the UE is a network name of the 3G network; and if during a process of executing the VoIP service by the UE, the UE executes PS handover (HO) to be handed over to the LTE network, the UE keeps displaying a network name of the 3G network, to enhance user experience.

For another example, during a process of executing a voice service in a CS domain by the UE on a 2G network or a 3G network, the UE needs to execute rSRVCC to be handed over to an LTE network or a 3G network; or during a process of executing a voice service in a CS domain by the UE on a 2G network or a 3G network, the UE needs to execute CS handover to be handed over to another 2G network or 3G network. In this case, a change, which is caused by rSRVCC execution or CS handover execution, of a network name displayed on the UE needs to be avoided. Therefore, the UE keeps displaying a network name of a network on which the voice service is triggered initially, to enhance user experience.

Specifically, after the UE is handed over to an LTE network and when the UE receives an EMM information message sent by an MME on the LTE network, or after the UE is handed over to a 2G network or a 3G network and when the UE receives a GMM information message or an MM information message sent by an SGSN or an MSC/VLR, the UE does not change a previously displayed network name, that is, the UE ignores a network name informed by the EMM Information or the GMM information or the MM information; or after the UE is handed over to an LTE network or a CS domain network, the UE does not display a network name according to a PLMN ID of the LTE network or the CS domain network in which the UE currently resides.

In this embodiment of the present invention, if a UE falls back to or is handed over to a 2G network or a 3G network, or is handed over from a first network to a third network, the UE displays a network name displayed before fallback and handover, and does not change the displayed network name, thereby avoiding a problem where a network name displayed on the UE changes during a process of executing services, such as a CSFB service and a voice service, and ensuring consistency of the network name displayed on the UE with the network name recorded in the network device, so that user experience is enhanced.

Optionally, in this embodiment, when the service executed in step 420 ends, the UE may change a displayed network name, that is, the UE may display a second network name instead of displaying a first network name. For example, in this case, the UE may display a second network name informed by an EMM information message, a GMM information message, or an MM information message, or may also display a second network name according to a PLMN ID of a network on which the UE is currently located.

Figure 5:
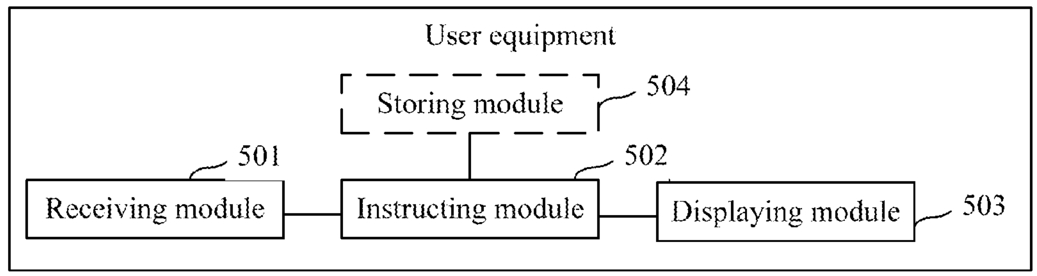
FIG. 5 is a schematic structural diagram of a user equipment according to an embodiment of the present invention.

Based on the methods provided in the foregoing embodiments, an embodiment further provides a user equipment, where the user equipment can execute the methods for displaying a network name in the foregoing embodiments of the present invention. This embodiment only briefly describes a structure of the user equipment. For a specific principle, refer to the descriptions in the method embodiments. As shown in FIG. 5, the user equipment includes the following.

A receiving module 501 is configured to receive a public land mobile network identity PLMN ID of a long term evolution network and a PLMN ID of a first circuit switched domain network by executing a combined attach procedure or a combined tracking area update procedure, where the long term evolution network and the first circuit switched domain network are two networks with which the UE jointly registers by using the combined attach procedure or the combined tracking area update procedure.

An instructing module 502 is configured to: acquire the PLMN ID of the long term evolution network and the PLMN ID of the first circuit switched domain network that are received by the receiving module 501; before a to-be-displayed second network name sent by a first network device on the long term evolution network is acquired, acquire a first network name corresponding to a predetermined PLMN ID; and instruct a displaying module 503 to display the first network name, where the predetermined PLMN ID is one of the PLMN ID of the long term evolution network and the PLMN ID of the first circuit switched domain network. The displaying module 503, configured to display the first network name instructed by the instructing module 502. The instructing module 502 is specifically configured to acquire, in the following manner, the first network name corresponding to the predetermined PLMN ID: determine whether a home PLMN ID is the same as the PLMN ID of the long term evolution network and the PLMN ID of the first circuit switched domain network; and if the home PLMN ID is different from both the PLMN ID of the long term evolution network and the PLMN ID of the first circuit switched domain network, acquire the first network name corresponding to the predetermined PLMN ID.

Further, the user equipment may further include a storing module 504, configured to: store a PLMN ID and a corresponding network name, and store the predetermined PLMN ID. The instructing module 502 is specifically configured to acquire, in the following manner, a first network name corresponding to a predetermined PLMN ID: acquire the predetermined PLMN ID and the first network name corresponding to the predetermined PLMN ID from the storing module 504.

Further, the receiving module 501 may further be configured to receive the to-be-displayed second network name sent by the first network device on the long term evolution network. The instructing module 502 is further configured to: acquire the second network name received by the receiving module 501, and instruct the displaying module to display the second network name.

Further, the receiving module 501 is further configured to: during a change from the long term evolution network to the first circuit switched domain network or a second circuit switched domain network, receive a third network name, where the first circuit switched domain network and the second circuit switched domain network belong to a 2G network or a 3G network, and the third network name is received from a second network device on the 2G network or the 3G network. The instructing module 502 is further configured to: during a process of executing a service on the long term evolution network, change from the long term evolution network to the first circuit switched domain network or the second circuit switched domain network, acquire the third network name received by the receiving module 501, and keep a currently displayed network name unchanged, or ignore the third network name. The service is a circuit switched fallback CSFB service, and the instructing module is specifically configured to: during the process of executing the service on the long term evolution network, change from the long term evolution network to the first circuit switched domain network or the second circuit switched domain network in the following manner: when the CSFB service is executed, fall back from the long term evolution network to the first circuit switched domain network or the second circuit switched domain network.

Alternatively, the service is a voice service, and the instructing module is specifically configured to: during the process of executing the service on the long term evolution network, change from the long term evolution network to the first circuit switched domain network or the second circuit switched domain network in the following manner: when the voice service is executed, hand over to the 2G network or the 3G network to execute the voice service.

The user equipment in this embodiment can execute the methods in the foregoing embodiments. For details, refer to the descriptions in the foregoing embodiments. In addition, a technical effect that can be implemented by the user equipment is the same as that in the foregoing embodiments, and details are not described herein again.

Figure 6:
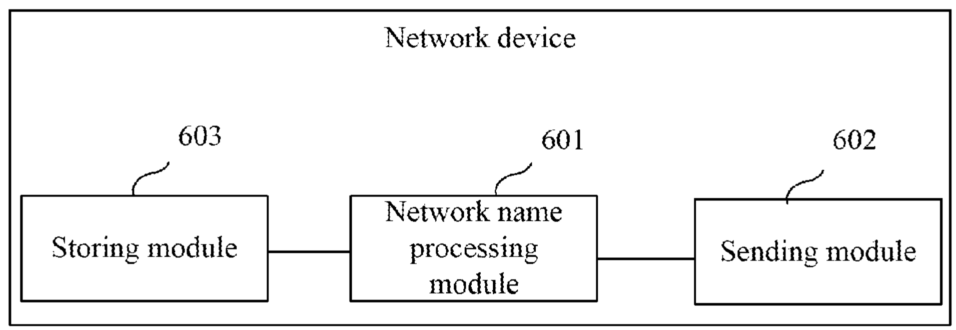
FIG. 6 is a schematic structural diagram of a network device according to an embodiment of the present invention.

Based on the methods provided in the foregoing embodiments, an embodiment further provides a network device, where the network device can execute the methods for displaying a network name in the foregoing embodiments, which are corresponding to the network device, of the present invention. This embodiment only briefly describes a structure of the network device. For a specific principle, refer to the descriptions in the method embodiments. As shown in FIG. 6, the network device includes the following.

A sending module 602 is configured to send a public land mobile network identity PLMN ID of a long term evolution network and a PLMN ID of a circuit switched domain network to a user equipment UE by using a combined attach procedure or a combined tracking area update procedure, where the network device is a network device on the long term evolution network, and the long term evolution network and the circuit switched domain network are two networks with which the UE jointly registers by using the combined attach procedure or the combined tracking area update procedure.

A storing module 603 is configured to store a first configuration, where the first configuration is information of a first network name, the information of the first network name is a predetermined PLMN ID and/or a first network name corresponding to the predetermined PLMN ID, the first network name is a network name displayed on the UE according to a second configuration of the UE, the first configuration is the same as the second configuration, and the predetermined PLMN ID is one of the PLMN ID of the long term evolution network and the PLMN ID of the circuit switched domain network.

A network name processing module 601 is configured to: after the sending module sends the PLMN ID of the long term evolution network and the PLMN ID of the circuit switched domain network to the UE, acquire the first configuration stored by the storing module 603.

The network name processing module 601 is specifically configured to acquire the first configuration stored by the storing module: determine whether a home PLMN ID of the UE is the same as the PLMN ID of the long term evolution network and the PLMN ID of the circuit switched domain network; and if the home PLMN ID is different from both the PLMN ID of the long term evolution network and the PLMN ID of the circuit switched domain network, acquire the first configuration stored by the storing module 603.

Further, the network name processing module 601 may be further configured to: determine whether an operator to whom the PLMN ID of the long term evolution network belongs is the same as an operator to whom the PLMN ID of the circuit switched domain network belongs; and if the operator to whom the PLMN ID of the long term evolution network belongs is different from the operator to whom the PLMN ID of the circuit switched domain network belongs, instruct the sending module 602 to send information of a second network name.

The sending module 602 is further configured to send, to the UE, the information of the second network name instructed by the network name processing module 601.

If the network device is a mobility management entity MME, the sending module is specifically configured to send the information of the second network name to the UE by using a universal mobile telecommunication system territorial radio access network E-UTRAN mobile management information EMM information message.

The network device in this embodiment can execute the methods in the foregoing embodiments. For details, refer to the descriptions in the foregoing embodiments. In addition, a technical effect that can be implemented by the network device is the same as that in the foregoing embodiments, and details are not described herein again.

Figure 7:
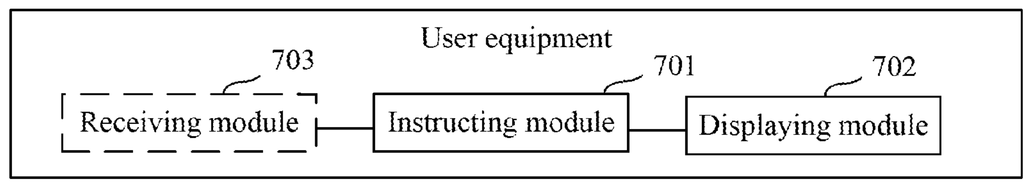
FIG. 7 is a schematic structural diagram of a user equipment according to another embodiment of the present invention.

Based on the methods provided in the foregoing embodiments, an embodiment further provides a user equipment, where the user equipment can execute the foregoing method for displaying a network name in the third embodiment of the present invention. This embodiment only briefly describes a structure of the user equipment. For a specific principle, refer to the descriptions in the foregoing method embodiments. As shown in FIG. 7, the user equipment includes an instructing module 701, configured to: execute an attach procedure to attach to a first network, or execute a combined attach procedure to attach to a first network and a second network, and instruct a displaying module to display a first network name. During a process of executing a service on the first network, change from the first network to the second network or a third network, and instruct a displaying module 702 to display the first network name. The displaying module 702 is configured to display the first network name instructed by the instructing module 701.

Optionally, the instructing module 701 is specifically configured to: during a process of executing a circuit switched fallback CSFB service on the first network, fall back from the first network to the second network or the third network, and instruct the displaying module to display the first network name, where the first network is a long term evolution network, the second network and the third network are circuit switched domain networks, and the service is the CSFB service.

Optionally, the instructing module 701 is specifically configured to: during a process of executing a voice service on the first network, hand over to the second network or the third network, and instruct the displaying module to display the first network name, where the service is the voice service.

Optionally, the instructing module 701 is specifically configured to: during the process of executing the voice service on the first network, hand over to the second network or the third network in the following manner.

The voice service is started on the long term evolution network, execute single radio voice call continuity or execute packet switched handover, and hand over to the second network or the third network to execute the voice service. The first network is the long term evolution network, and the second network or the third network is a circuit switched domain network.

Alternatively, the voice service is started on a first 2G network or a first 3G network, execute reverse single radio voice call continuity, hand over to a 4G network or a second 3G network or a second 2G network to execute the voice service, and instruct the displaying module to display the first network name. The first network is the first 2G network or the first 3G network, and the second network or the third network is the second 3G network, or the second network or the third network is the second 2G network, or the second network or the third network is the 4G network.

Alternatively, start the voice service on a first 2G network or a first 3G network, execute circuit switched handover, and hand over to a second 3G network or a second 2G network to execute the voice service, where the first network is the first 2G network or the first 3G network, and the second network or the third network is the second 3G network, or the second network or the third network is the second 2G network.

The user equipment may further include a receiving module 703, where the receiving module 703 is configured to receive a second network name of the second network or the third network. The instructing module 701 is specifically configured to instruct, in the following manner, the displaying module 702 to display the first network name: acquire the second network name received by the receiving module 703, and ignore the second network name, or instruct the displaying module 702 to display the first network name.

Optionally, the instructing module 701 is further configured to: if execution of the service is complete, instruct the displaying module 702 to display the second network name, where the second network name is a network name of the second network or the third network. The displaying module 702 is configured to display the second network name instructed by the instructing module 701.

The user equipment in this embodiment can execute the methods in the foregoing embodiments. For details, refer to the descriptions in the foregoing embodiments. In addition, a technical effect that can be implemented by the user equipment is the same as that in the foregoing embodiments, and details are not described herein again.

In addition, an embodiment of the present invention further provides a communications system, where the communications system includes the user equipment and the network device in the foregoing embodiments. For specific structures and functions of the user equipment and the network device, refer to the foregoing embodiments, and details are not described herein again.

Figure 8:
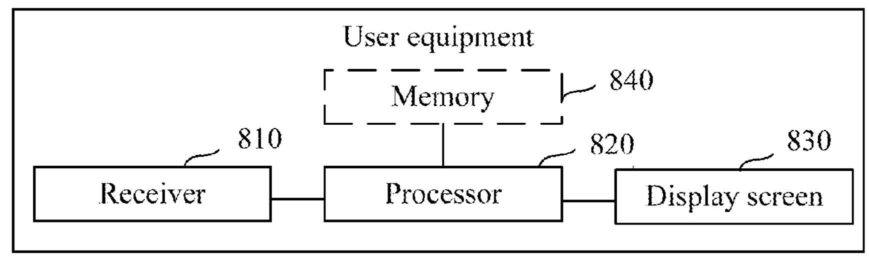
FIG. 8 is a schematic structural diagram of a user equipment according to another embodiment of the present invention.

Another embodiment of the present invention further provides a user equipment, where the user equipment can execute the methods for displaying a network name in the foregoing embodiments of the present invention. This embodiment only briefly describes a structure of the user equipment. For a specific principle, refer to the descriptions in the foregoing method embodiments. As shown in FIG. 8, the user equipment UE includes a receiver 810, a processor 820, and a display screen 830. The receiver 810 is configured to receive a public land mobile network identity PLMN ID of a long term evolution network and a PLMN ID of a first circuit switched domain network by executing a combined attach procedure or a combined tracking area update procedure, where the long term evolution network and the first circuit switched domain network are two networks with which the UE jointly registers by using the combined attach procedure or the combined tracking area update procedure. The processor 820 is configured to: acquire the PLMN ID of the long term evolution network and the PLMN ID of the circuit switched domain network that are received by the receiver 810; before a to-be-displayed second network name sent by a first network device on the long term evolution network is acquired, acquire a first network name corresponding to a predetermined PLMN ID; and instruct the display screen to display the first network name, where the predetermined PLMN ID is one of the PLMN ID of the long term evolution network and the PLMN ID of the circuit switched domain network. The display screen 830 is configured to display a network name instructed by the processor 820.

The user equipment in this embodiment can execute the methods in the foregoing embodiments; therefore, a technical effect that can be inplemented by the user equipment is the same as that in the foregoing embodiments, and details are not described herein again.

Further, the processor 820 is specifically configured to acquire, in the following manner, the first network name corresponding to the predetermined PLMN ID: determine whether a home PLMN ID is the same as the PLMN ID of the long term evolution network and the PLMN ID of the circuit switched domain network; and if the home PLMN ID is different from both the PLMN ID of the long term evolution network and the PLMN ID of the circuit switched domain network, acquire the first network name corresponding to the predetermined PLMN ID.

In addition, the user equipment may further include a memory 840, configured to: store different PLMN IDs and corresponding network names, and store the predetermined PLMN ID. The processor 820 is specifically configured to acquire, in the following manner, a first network name corresponding to a predetermined PLMN ID: acquire the predetermined PLMN ID and the first network name corresponding to the predetermined PLMN ID from the memory.

Further, the receiver 810 is further configured to receive the second network name sent by the first network device on the long term evolution network; and the processor 820 is further configured to: acquire the second network name received by the receiver, and instruct the display screen to display the second network name.

Further, the receiver 810 is further configured to: during a change from the long term evolution network to the first circuit switched domain network or a second circuit switched domain network, receive a third network name, where the first circuit switched domain network and the second circuit switched domain network belong to a 2G network or a 3G network, and the third network name is received from a second network device on the 2G network or the 3G network. The processor 820 is further configured to: during a process of executing a service on the long term evolution network, and during the change from the long term evolution network to the first circuit switched domain network or the second circuit switched domain network, acquire the third network name received by the receiver, and keep a currently displayed network name unchanged, or ignore the third network name. The service is a circuit switched fallback CSFB service, and the processor 820 is specifically configured to: during the process of executing the service on the long term evolution network, change from the long term evolution network to the first circuit switched domain network or the second circuit switched domain network in the following manner: when the CSFB service is executed, fall back from the long term evolution network to the first circuit switched domain network or the second circuit switched domain network.

Alternatively, the service is a voice service, and the processor 820 is specifically configured to: during the process of executing the service on the long term evolution network, change from the long term evolution network to the first circuit switched domain network or the second circuit switched domain network in the following manner: when the voice service is executed, hand over, by using a network device on the long term evolution network, to the 2G network or the 3G network to execute the voice service.

Figure 9:
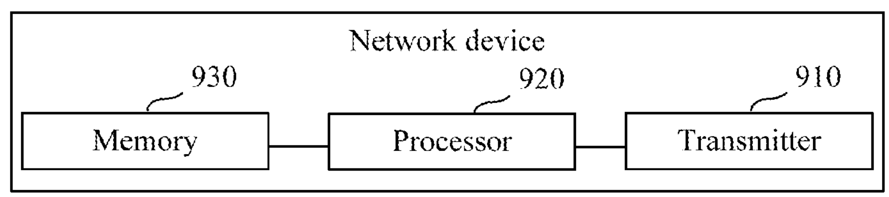
FIG. 9 is a schematic structural diagram of a network device according to another embodiment of the present invention.

Another embodiment of the present invention further provides a network device, where the network device can execute the methods for displaying a network name in the foregoing embodiments of the present invention. This embodiment only briefly describes a structure of the network device. For a specific principle, refer to the descriptions in the foregoing method embodiments. As shown in FIG. 9, the network device includes a transmitter 910 and a processor 920.

The transmitter 910 is configured to send a public land mobile network identity PLMN ID of a long term evolution network and a PLMN ID of a circuit switched domain network to a user equipment UE by using a combined attach procedure or a combined tracking area update procedure, where the network device is a network device on the long term evolution network, and the long term evolution network and the circuit switched domain network are two networks with which the UE jointly registers by using the combined attach procedure or the combined tracking area update procedure.

A memory 930 is configured to store a first configuration, where the first configuration is information of a first network name, the information of the first network name is a predetermined PLMN ID and/or a first network name corresponding to the predetermined PLMN ID, the first network name is a network name displayed on the UE according to a second configuration of the UE, the first configuration is the same as the second configuration, and the predetermined PLMN ID is one of the PLMN ID of the long term evolution network and the PLMN ID of the circuit switched domain network.

The processor 920 is configured to: after the transmitter sends the PLMN ID of the long term evolution network and the PLMN ID of the circuit switched domain network to the UE, acquire the first configuration stored by the memory 930.

The processor 920 is specifically configured to acquire, in the following manner, the first configuration stored by the memory 930: determine whether a home PLMN ID of the UE is the same as the PLMN ID of the long term evolution network and the PLMN ID of the circuit switched domain network; and if the home PLMN ID is different from both the PLMN ID of the long term evolution network and the PLMN ID of the circuit switched domain network, acquire the first configuration stored by the memory.

The processor 920 is further configured to: determine whether an operator to whom the PLMN ID of the long term evolution network belongs is the same as an operator to whom the PLMN ID of the circuit switched domain network belongs; and if the operator to whom the PLMN ID of the long term evolution network belongs is different from the operator to whom the PLMN ID of the circuit switched domain network belongs, instruct the transmitter 910 to send information of a second network name.

The transmitter is further configured to send, to the UE, the information of the second network name instructed by the processor 920.

Further, if the network device is a mobility management entity MME, the transmitter is specifically configured to send the information of the second network name to the UE by using a universal mobile telecommunication system territorial radio access network E-UTRAN mobile management information EMM information message.

Figure 10:
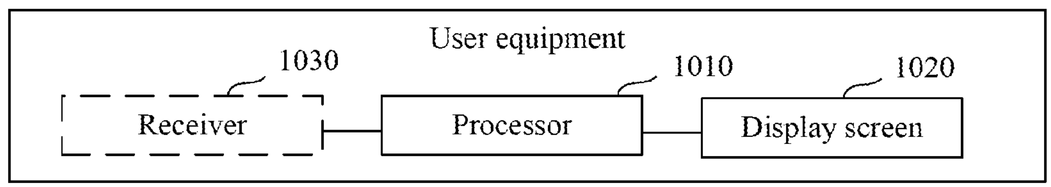
FIG. 10 is a schematic structural diagram of a user equipment according to another embodiment of the present invention.

Another embodiment of the present invention further provides a user equipment, where the user equipment can execute the methods for displaying a network name in the foregoing embodiments of the present invention. This embodiment only briefly describes a structure of the user equipment. For a specific principle, refer to the descriptions in the foregoing method embodiments. As shown in FIG. 10, the user equipment UE includes a processor 1010 and a display screen 1020. The processor 1010 is configured to: execute a combined attach procedure to attach to a first network, or execute a combined attach procedure to attach to a first network and a second network, and instruct the display screen to display a first network name. During a process of executing a service on the first network, change from the first network to the second network or a third network, and instruct the display screen to display the first network name. The display screen 1020 is configured to display the first network name instructed by the processor 1010.

The user equipment in this embodiment can execute the methods in the foregoing embodiments; therefore, a technical effect that can be implemented by the user equipment is the same as that in the foregoing method embodiments, and details are not described herein again.

Further, the processor 1010 is specifically configured to: during the process of executing the service on the first network, change from the first network to the second network or the third network in the following manner: during a process of executing a circuit switched fallback CSFB service on the first network, fall back from the first network to the second network or the third network, where the first network is the long term evolution network, the second network and the third network are circuit switched domain networks, and the service is the CSFB service. Alternatively, the processor 1010 is specifically configured to: during the process of executing the service on the first network, change from the first network to the second network or the third network in the following manner: during a process of executing a voice service by the first network, hand over to the second network or the third network, where the service is the voice service.

Further, the processor 1010 is specifically configured to: during the process of executing the voice service on the first network, hand over to the second network or the third network in the following manner: start the voice service on the long term evolution network, execute single radio voice call continuity or execute packet switched handover, and hand over to the second network or the third network to execute the voice service, where the first network is the long term evolution network, and the second network or the third network is a circuit switched domain network; or start the voice service on a first 2G network or a first 3G network, execute reverse single radio voice call continuity, hand over to a 4G network or a second 3G network or a second 2G network to execute the voice service, and instruct the display screen to display the first network name, where the first network is the first 2G network or the first 3G network, and the second network or the third network is the second 3G network, or the second network or the third network is the second 2G network, or the second network or the third network is the 4G network; or start the voice service on a first 2G network or a first 3G network, execute circuit switched handover, hand over to a second 3G network or a second 2G network to execute the voice service, where the first network is the first 2G network or the first 3G network, and the second network or the third network is the second 3G network, or the second network or the third network is the second 2G network.

In addition, the user equipment may further include a receiver 1030, where the receiver 1030 is configured to receive a second network name of the second network or the third network. The processor 1010 is specifically configured to: receive the second network name transmitted by the receiver, and ignore the second network name, or instruct the display screen 1020 to display the first network name.

Further, the processor 1010 is further configured to: if execution of the service is complete, instruct the display screen to display the second network name, where the second network name is a network name of the second network or the third network. The display screen is further configured to display the second network name instructed by the processor.

It should be noted that the user equipment and the network device in each of the foregoing embodiments may include the foregoing modules, and in addition, may further include a radio frequency processor, a power controller, and another part, and the embodiments of the present invention are not limited to including only the foregoing modules.

It should be noted that, in the foregoing embodiments concerning the user equipment and the network device, division of functional modules is only used as an example, and in an actual application, the foregoing functions may be assigned to different functional modules for completion according to a need, for example, according to a corresponding hardware configuration requirement or for ease of software implementation; that is, internal structures of the user equipment and the base station are divided into different functional modules, to complete all or a part of the functions described above. Further, in an actual application, corresponding functional modules in the embodiments may be implemented by corresponding hardware, or may be completed by corresponding hardware by executing corresponding software; for example, the foregoing sending module may be hardware that can executing functions of the foregoing sending module, such as a transmitter, and may also be a universal processor that can execute a corresponding computer program to complete the foregoing functions, or another hardware device. For another example, the foregoing processing module may be hardware that has a function of executing the foregoing processing module, such as a processor, and may also be another hardware device that can execute a corresponding computer program to complete the foregoing functions. For still another example, the foregoing receiving module may be hardware that has a function of executing the foregoing receiving module, such as a receiver, and may also be a universal processor that can execute a corresponding computer program to complete the foregoing functions, or another hardware device (The principle of the foregoing descriptions may be applied to each embodiment provided in this specification).

Figure 11:
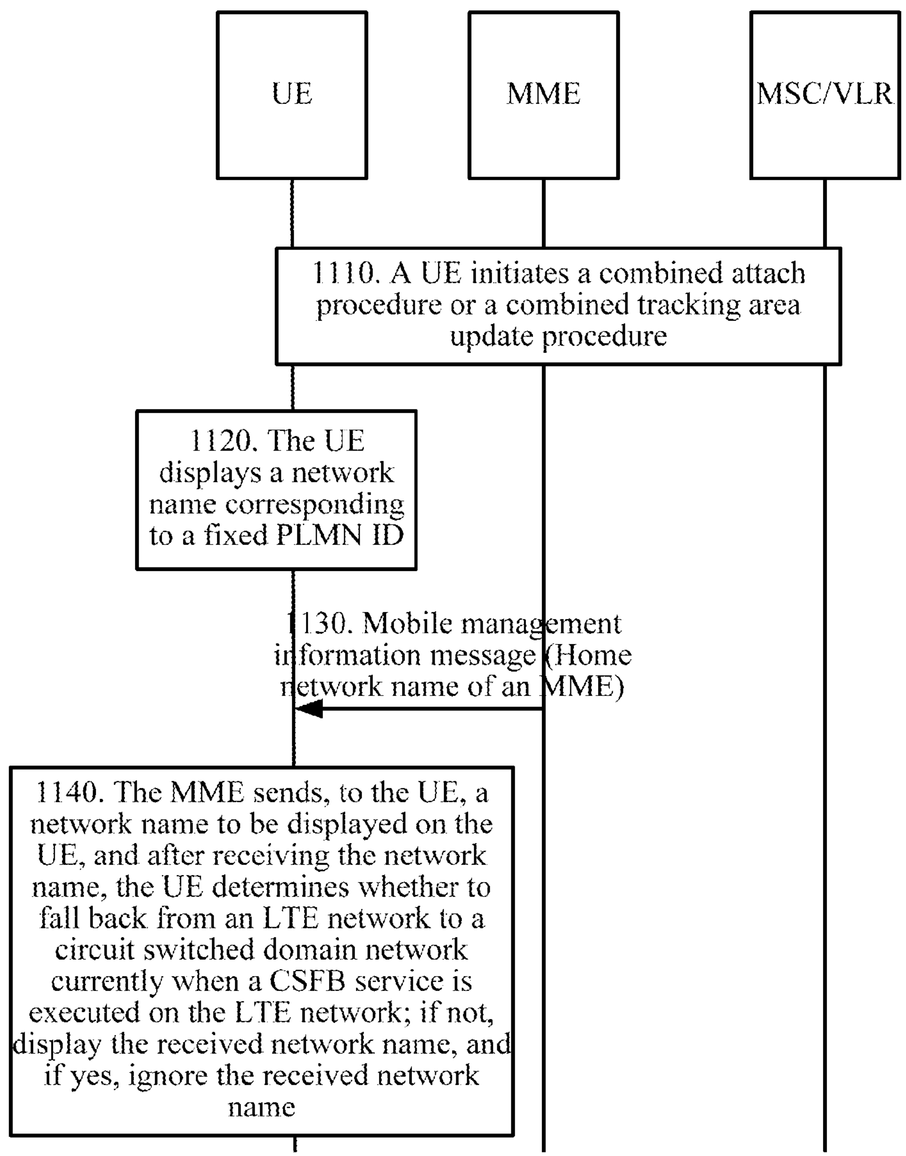
FIG. 11 is a schematic diagram of a process of an application example according to the present invention.

An application example is used in the following to introduce a process of executing the foregoing methods and apparatuses in the embodiments of the present invention. In this application example, that a network device is an MME is used as an example. However, it should be noted that there may be a different network device in a different scenario, and the embodiments of the present invention is not limited to this. As shown in FIG. 11, the application example specifically includes the following steps.

Step 1110: A UE and the MME execute a combined attach process, and the UE obtains a PLMN ID of an LTE network and a PLMN ID of a CS domain network.

Step 1120: The UE displays, according to a preset rule, a network name corresponding to a predetermined PLMN ID.

Step 1130: The MME sends, to the UE, a network name to be displayed on the UE, and after receiving the network name, the UE determines whether to fall back from the LTE network to a circuit switched domain network currently when a CSFB service is executed on the LTE network; if the UE determines not to fall back from an LTE network to a circuit switched domain network, display the received network name, and if the UE determines to fall back from an LTE network to a circuit switched domain network, ignore the received network name.

It should be noted that this application example is only an application scenario in the foregoing embodiment, and in fact, a part of steps are optional. For details, refer to the descriptions in the foregoing embodiments.

A person of ordinary skill in the art may understand that all or a part of the steps of the methods in the embodiments may be implemented by a program instructing relevant hardware. The program may be stored in a computer readable storage medium. The storage medium may include: a read-only memory (ROM), a random access memory (RAM), a magnetic disk, or an optical disc.

The foregoing introduces in detail the method, the user equipment, and the base station provided in the embodiments of the present invention. Specific examples are used in this specification to describe the principle and implementation manners of the present invention. The foregoing embodiments are merely intended to help understand the method and core idea of the present invention. In addition, with respect to the implementation manners and the application scope, modifications may be made by a person of ordinary skill in the art according to the idea of the present invention. Therefore, the content of this specification shall not be construed as a limitation on the present invention.

What is claimed is:

1. A method for displaying a network name, the method comprising:

registering, by a user equipment (UE), by using a combined attach procedure or a combined tracking area update procedure, with a long term evolution network and a first circuit switched domain network, and acquiring a public land mobile network identity (PLMN ID) of the long term evolution network and a PLMN ID of the first circuit switched domain network;

determining, by the UE, that the PLMN ID of the long term evolution network is different from the PLMN ID of the first circuit switched domain network;

after the determining but before a to-be-displayed second network name sent by a first network device on the long term evolution network is received, displaying, by the UE, a first network name corresponding to a predetermined PLMN ID, wherein the predetermined PLMN ID is one of the PLMN ID of the long term evolution network and the PLMN ID of the circuit switched domain network; and displaying, by the UE, the second network name after receiving the to-be-displayed second network name from the first network device.

2. The method according to claim 1, wherein before displaying the first network name by the UE, the method further comprises:

determining, by the UE, whether a home PLMN ID is the same as the PLMN ID of the long term evolution network and the PLMN ID of the circuit switched domain network; and the displaying, by the UE, a first network name corresponding to a predetermined PLMN ID comprises:

if the home PLMN ID is different from both the PLMN ID of the long term evolution network and the PLMN ID of the circuit switched domain network, displaying, by the UE, the first network name corresponding to the predetermined PLMN ID.

3. The method according to claim 1, wherein after the displaying, by the UE, a first network name corresponding to a predetermined PLMN ID, the method further comprises:

if the second network name sent by the first network device on the long term evolution network is received, displaying, by the UE, the second network name sent by the first network device.

4. The method according to claim 1, wherein after the displaying, by the UE, a first network name corresponding to a predetermined PLMN ID, the method further comprises:

during a process of executing a service on the long term evolution network, changing, by the UE, from the long term evolution network to the first circuit switched domain network or a second circuit switched domain network; and receiving, by the UE, a to-be-displayed third network name sent by a second network device, and keeping, by the UE, a currently displayed network name unchanged, or ignoring the third network name; and wherein the first circuit switched domain network and the second circuit switched domain network belong to a 2G network, and the second network device is a network device on the 2G network; or wherein the first circuit switched domain network and the second circuit switched domain network belong to a 3G network, and the second network device is a network device on the 3G network.

5. The method according to claim 4, wherein the service is a circuit switched fallback (CSFB) service, and the changing, by the UE, from the long term evolution network to the first circuit switched domain network or a second circuit switched domain network comprises:

when the UE executes the CSFB service, falling back, by the UE, from the long term evolution network to the first circuit switched domain network or the second circuit switched domain network; or wherein the service is a voice service, and the changing, by the UE, from the long term evolution network to the first circuit switched domain network or a second circuit switched domain network comprises:

when the UE executes the voice service, handing over, by the UE, the voice service to the first circuit switched domain network or the second circuit switched domain network.

6. A method for displaying a network name, the method comprising:

sending, by a network device by using a combined attach procedure or a combined tracking area update procedure, a public land mobile network identity (PLMN ID) of a long term evolution network and a PLMN ID of a circuit switched domain network to a user equipment (UE), wherein the network device is a network device on the long term evolution network, and the long term evolution network and the circuit switched domain network are two networks with which the UE jointly registers by using the combined attach procedure or the combined tracking area update procedure;

determining, by the network device, that the PLMN ID of the long term evolution network is different from the PLMN ID of the circuit switched domain network;

acquiring a configuration prestored by the network device, wherein the configuration is information of a first network name, the information of the first network name is a PLMN ID corresponding to a first network name displayed on the UE and/or the first network name displayed on the UE, the first network name displayed on the UE is the first network name corresponding to a predetermined PLMN ID, and the predetermined PLMN ID is one of the PLMN ID of the long term evolution network and the PLMN ID of the circuit switched domain network; and sending a network name to be displayed at the UE from the network device to the UE.

7. The method according to claim 6, wherein before the acquiring a configuration prestored by the network device, the method further comprises:

determining, by the network device, whether a home PLMN ID of the UE is the same as the PLMN ID of the long term evolution network and the PLMN ID of the circuit switched domain network; and the acquiring a configuration prestored by the network device comprises: if the home PLMN ID is different from both the PLMN ID of the long term evolution network and the PLMN ID of the circuit switched domain network, acquiring the configuration prestored by the network device.

8. The method according to claim 6, wherein after the acquiring a configuration prestored by the network device, the method further comprises:

if the network device determines that information of a second network name to be displayed on the UE needs to be sent to the UE, sending, by the network device, the information of the second network name to the UE.

9. The method according to claim 8, wherein that the network device determines that information of a second network name to be displayed on the UE needs to be sent to the UE comprises:

determining, by the network device, whether an operator to whom the PLMN ID of the long term evolution network belongs is the same as an operator to whom the PLMN ID of the circuit switched domain network belongs, wherein the UE jointly registers with the long term evolution network and the circuit switched domain network; and if the operator to whom the PLMN ID of the long term evolution network belongs is different from the operator to whom the PLMN ID of the circuit switched domain network belongs, sending, by the network device, the second network name to the UE.

10. The method according to claim 8, wherein the network device is a mobility management entity (MME), the sending, by the network device, the information of the second network name to the UE comprises: sending, by the MME by using a universal mobile telecommunication system territorial radio access network (E-UTRAN) mobile managment information (EMM) information message, the information of the second network name to the UE.

11. A network device comprising:

a transmitter configured to send a public land mobile network identity (PLMN ID) of a long term evolution network and a PLMN ID of a circuit switched domain network to a user equipment (UE) by using a combined attach procedure or a combined tracking area update procedure, wherein the network device is a network device on the long term evolution network, and the long term evolution network and the circuit switched domain network are two networks with which the UE jointly registers by using the combined attach procedure or the combined tracking area update procedure;

a memory configured to store a first configuration, wherein the first configuration is information of a first network name, the information of the first network name is a predetermined PLMN ID and/or a first network name corresponding to the predetermined PLMN ID, the first network name is a network name displayed on the UE according to a second configuration of the UE, the first configuration is the same as the second configuration, and the predetermined PLMN ID is one of the PLMN ID of the long term evolution network and the PLMN ID of the circuit switched domain network; and a processor configured to execute a program stored in the memory, the program including instructions to:

determine that the PLMN ID of the long term evolution network is different from the PLMN ID of the circuit switched domain network;

acquire the first configuration stored by the memory after the transmitter sends the PLMN ID of the long term evolution network and the PLMN ID of the circuit switched domain network to the UE; and determine a network name to be sent to the UE to be displayed at the UE from the network device to the UE.

12. The network device according to claim 11, wherein the program including further instructions to acquire, in the following manner, the first configuration stored by memory:

determine whether a home PLMN ID of the UE is the same as the PLMN ID of the long term evolution network and the PLMN ID of the circuit switched domain network; and if the home PLMN ID is different from both the PLMN ID of the long term evolution network and the PLMN ID of the circuit switched domain network, acquire the first configuration stored by the memory.

13. The network device according to claim 11, wherein the program including further instructions to:

determine whether an operator to whom the PLMN ID of the long term evolution network belongs is the same as an operator to whom the PLMN ID of the circuit switched domain network belongs; and if the operator to whom the PLMN ID of the long term evolution network belongs is different from the operator to whom the PLMN ID of the circuit switched domain network belongs, instruct the transmitter to send information of a second network name; and the transmitter is further configured to send, to the UE, the information of the second network name.

14. The network device according to claim 13, wherein the network device is a mobility management entity (MME), the transmitter is configured to send the information of the second network name to the UE by using a universal mobile telecommunication system territorial radio access network (E-UTRAN) mobile management information (EMM) information message.

15. A user equipment (UE), comprising:

a receiver, configured to receive a public land mobile network identity (PLMN ID) of a long term evolution network and a PLMN ID of a first circuit switched domain network by executing a combined attach procedure or a combined tracking area update procedure, wherein the long term evolution network and the first circuit switched domain network are two networks with which the UE jointly registers by using the combined attach procedure or the combined tracking area update procedure;

a memory storing a program;

a processor, configured to execute the program, the program including instructions to:

acquire the PLMN ID of the long term evolution network and the PLMN ID of the first circuit switched domain network that are received by the receiver;

determine that the PLMN ID of the long term evolution network is different from the PLMN ID of the first circuit switched domain network;

before a to-be-displayed second network name sent by a first network device on the long term evolution network is acquired, acquire a first network name corresponding to a predetermined PLMN ID; and instruct a display screen to display the first network name, wherein the predetermined PLMN ID is one of the PLMN ID of the long term evolution network and the PLMN ID of the circuit switched domain network;

instruct the display screen to display the second network name after receiving the to-be-displayed second network name from the first network device; and the display screen, configured to display the first network name instructed by the processor.

16. The user equipment according to claim 15, wherein the program including further instructions to acquire, in the following manner, the first network name corresponding to the predetermined PLMN ID: determine whether a home PLMN ID is the same as the PLMN ID of the long term evolution network and the PLMN ID of the circuit switched domain network; and if the home PLMN ID is different from both the PLMN ID of the long term evolution network and the PLMN ID of the circuit switched domain network, acquire the first network name corresponding to the predetermined PLMN ID.

17. The user equipment according to claim 15, further comprising:

a memory, configured to: store different PLMN IDs and corresponding network names, and store the predetermined PLMN ID;

the program including further instructions to acquire, in the following manner, a first network name corresponding to a predetermined PLMN ID: acquire the predetermined PLMN ID and the first network name corresponding to the predetermined PLMN ID from the memory.

18. The user equipment according to claim 15, wherein the receiver is further configured to receive the second network name sent by the first network device on the long term evolution network; and the program including further instructions to: acquire the second network name received by the receiver, and instruct the display screen to display the second network name.

19. The user equipment according to claim 15, wherein the receiver is further configured to: during a change from the long term evolution network to the first circuit switched domain network or a second circuit switched domain network, receive a third network name, wherein the first circuit switched domain network and the second circuit switched domain network belong to a 2G network or a 3G network, and the third network name is received from a second network device on the 2G network or the 3G network; and the program including further instructions to: during a process of executing a service on the long term evolution network, and during the change from the long term evolution network to the first circuit switched domain network or the second circuit switched domain network, acquire the third network name received by the receiver, and keep a currently displayed network name unchanged, or ignore the third network name.

20. The user equipment according to claim 19, wherein the service is a circuit switched fallback (CSFB) service, and the processor is specifically configured to: during the process of executing the service on the long term evolution network, change from the long term evolution network to the first circuit switched domain network or the second circuit switched domain network in the following manner: when the CSFB service is executed, fall back from the long term evolution network to the first circuit switched domain network or the second circuit switched domain network; or the service is a voice service, and the processor program including further instructions to: during the process of executing the service on the long term evolution network, change from the long term evolution network to the first circuit switched domain network or the second circuit switched domain network in the following manner: when the voice service is executed, hand over, by using a network device on the long term evolution network, to the 2G network or the 3G network to execute the voice service.

* * * * *